US011236924B2

(12) United States Patent
Seo et al.

(10) Patent No.: US 11,236,924 B2
(45) Date of Patent: Feb. 1, 2022

(54) AUTOMATIC TEMPERATURE CONTROLLING METHOD AND DEVICE

(71) Applicant: Samsung Electronics Co., Ltd., Gyeonggi-do (KR)

(72) Inventors: Sungmok Seo, Gyeonggi-do (KR); Vishnu Vardhan Vinjam, Gyeonggi-do (KR); Jeongil Seo, Seoul (KR); Kwanwoo Song, Gyeonggi-do (KR); Dongseop Lee, Gyeonggi-do (KR)

(73) Assignee: Samsung Electronics Co., Ltd (*) Notice: Subject to any disclaimer, the term of this patent is extended or adjusted under 35 U.S.C. 154(b) by 0 days.

(21) Appl. No.: 16/068,429

(22) PCT Filed: Jan. 6, 2017

(86) PCT No.: PCT/KR2017/000226
§ 371 (c)(1),
(2) Date: Jul. 6, 2018

(87) PCT Pub. No.: WO2017/119783
PCT Pub. Date: Jul. 13, 2017

(65) Prior Publication Data
US 2019/0011146 A1 Jan. 10, 2019

(30) Foreign Application Priority Data
Jan. 6, 2016 (KR) ........................ 10-2016-0001695

(51) Int. Cl.
F24F 11/63 (2018.01)
G05D 23/19 (2006.01)
(Continued)

(52) U.S. Cl.
CPC .............. F24F 11/63 (2018.01); F24F 11/30 (2018.01); F24F 11/46 (2018.01); F24F 11/52 (2018.01);
(Continued)

(58) Field of Classification Search
CPC .. F24F 11/63; F24F 11/52; F24F 11/80; F24F 2110/12; F24F 2120/20; F24F 2130/10;
(Continued)

(56) References Cited

U.S. PATENT DOCUMENTS 5,924,486 A 7/1999 Ehlers et al.
2006/0123811 A1 6/2006 Ha et al.
(Continued)

FOREIGN PATENT DOCUMENTS

CN 101910738 12/2010
CN 101952665 1/2011
(Continued)

OTHER PUBLICATIONS

PCT/ISA/210 Search Report issued on PCT/KR2017/000226 (pp. 3).
(Continued)

Primary Examiner — Jigneshkumar C Patel
(74) Attorney, Agent, or Firm — The Farrell Law Firm, P.C.

(57) ABSTRACT

The present disclosure relates to a technology for Sensor Networks, Machine to Machine (M2M), Machine Type Communication (MTC), and Internet of Things (IoT). The present disclosure may be used for an intelligent service (smart home, smart building, smart city, smart car or connected car, health care, digital education, retail business, security and safety-related service, etc.) that is based on the above technologies. The present invention, with respect to a set temperature control method, is characterized by comprising the steps of: setting a control section which is a time section for controlling a set temperature in a certain space; collecting user set temperature information according to weather information for each control section, and predicted weather information; determining set temperature control (Continued)

information for each of the control sections on the basis of the collected set temperature information; and controlling the set temperature in the certain space on the basis of the set temperature control information determined for each of the control sections and the predicted weather information.

14 Claims, 22 Drawing Sheets

(51) Int. Cl.
    *F24F 11/46* (2018.01)
    *F24F 11/30* (2018.01)
    *F24F 11/64* (2018.01)
    *F24F 11/80* (2018.01)
    *F24F 11/52* (2018.01)
    *F24F 130/10* (2018.01)
    *F24F 120/10* (2018.01)
    *F24F 120/20* (2018.01)
    *F24F 110/12* (2018.01)

(52) U.S. Cl.
    CPC ............. *F24F 11/64* (2018.01); *F24F 11/80* (2018.01); *G05D 23/1951* (2013.01); *F24F 2110/12* (2018.01); *F24F 2120/10* (2018.01); *F24F 2120/20* (2018.01); *F24F 2130/10* (2018.01)

(58) Field of Classification Search
    CPC ........ F24F 2120/10; F24F 11/30; F24F 11/46; F24F 11/64; G05D 23/1951
    USPC ......................................................... 700/278
    See application file for complete search history.

(56) References Cited

U.S. PATENT DOCUMENTS

| | | | |
|---|---|---|---|
| 2006/0243815 | A1 | 11/2006 | Lee et al. |
| 2009/0057427 | A1* | 3/2009 | Geadelmann ....... G06F 16/9535 236/51 |
| 2009/0210095 | A1 | 8/2009 | Bush et al. |
| 2012/0253525 | A1 | 10/2012 | Suzuki |
| 2012/0305661 | A1* | 12/2012 | Malchiondo ............. F24F 11/30 236/44 A |
| 2013/0238144 | A1 | 9/2013 | Shahapurkar et al. |
| 2014/0058567 | A1 | 2/2014 | Matsuoka et al. |
| 2014/0088782 | A1 | 3/2014 | Ogino |
| 2014/0316599 | A1* | 10/2014 | Tomita ..................... H02J 3/14 700/295 |
| 2014/0365017 | A1* | 12/2014 | Hanna ..................... F24F 11/30 700/276 |
| 2015/0192911 | A1* | 7/2015 | Sloop ..................... G05B 15/02 700/291 |
| 2015/0285527 | A1 | 10/2015 | Kim et al. |
| 2016/0037689 | A1 | 2/2016 | Fu |
| 2016/0054021 | A1 | 2/2016 | Lee et al. |

FOREIGN PATENT DOCUMENTS

| | | |
|---|---|---|
| CN | 104279710 | 1/2015 |
| CN | 104964351 | 10/2015 |
| EP | 1 672 293 | 6/2006 |
| EP | 2 835 595 | 2/2015 |
| JP | S58-24740 | 2/1983 |
| JP | 8197933 | 8/1996 |
| JP | 2001-521139 | 11/2001 |
| JP | 2001-343142 | 12/2001 |
| JP | 2006-308280 | 11/2006 |
| JP | 2011-163732 | 8/2011 |
| JP | 2012-052706 | 3/2012 |
| JP | 2012-172945 | 9/2012 |
| JP | 2013-219893 | 10/2013 |
| JP | 2013-225166 | 10/2013 |
| JP | 2014-149117 | 8/2014 |
| JP | 2014-194290 | 10/2014 |
| JP | 2015-040693 | 3/2015 |
| KR | 100747579 | 8/2007 |
| KR | 1020110113363 | 10/2011 |
| KR | 1020110126997 | 11/2011 |
| KR | 1020120070726 | 7/2012 |
| KR | 20140099345 A * | 8/2014 |
| KR | 1020140099345 | 8/2014 |
| KR | 1020150115389 | 10/2015 |
| WO | WO 99/22284 | 5/1999 |
| WO | WO 2015/045619 | 4/2015 |
| WO | WO 2016/32186 | 3/2016 |

OTHER PUBLICATIONS

PCT/ISA/237 Written Opinion issued on PCT/KR2017/000226 (pp. 9).
European Search Report dated Nov. 30, 2018 issued in counterpart application No. 17736155.7-1008, 7 pages.
Chinese Office Action dated Mar. 17, 2020 issued in counterpart application No. 201780005827.3, 25 pages.
Japanese Office Action dated Feb. 9, 2021 issued in counterpart application No. 2018-528651, 13 pages.
Japanese Office Action dated Nov. 2, 2021 issued in counterpart application No. 2018-528651, 12 pages.

* cited by examiner

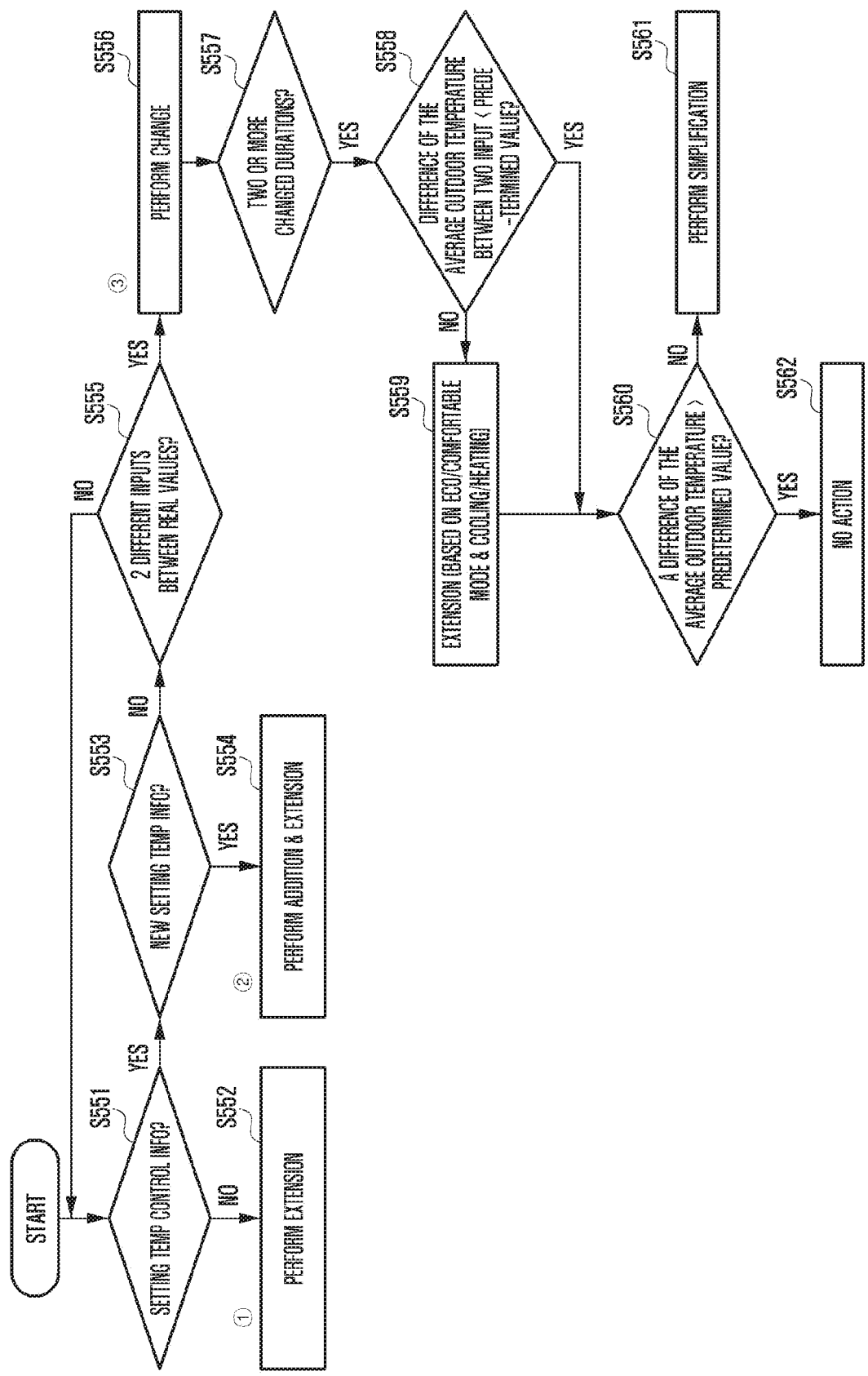

AUTOMATIC TEMPERATURE CONTROLLING METHOD AND DEVICE

PRIORITY

This application is a National Phase Entry of PCT International Application No. PCT/KR2017/000226 which was filed on Jan. 6, 2017, and claims priority to Korean Patent Application No. 10-2016-0001695, which was filed on Jan. 6, 2016, the content of each of which is incorporated herein by reference.

TECHNICAL FIELD

The present invention relates to an automatic temperature control method and device, and more particularly, to a method for determining setting temperature control information according to control duration and controlling a temperature of an indoor space according to environmental information (a value or statistics of outdoor temperature, outdoor humidity, outdoor sensory temperature, or indoor sensory temperature, or the number of occupants) and the setting temperature control information.

BACKGROUND ART

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Meanwhile, in order to increase the efficiency of energy use and improve user convenience, a method for automatically adjusting a setting temperature of a certain indoor space may be used. For example, there is a method for automatically adjusting the temperature of an indoor space by using a user's temperature setting pattern over time. However, this method is incapable of reflecting a variation of environmental information. Here, the environmental information may include at least one of values or statistics of outdoor temperature, outdoor humidity, outdoor sensory temperature, and indoor sensory temperature. Therefore, the above method has problems that the user has to reset the temperature and the efficiency of energy use is reduced.

Accordingly, there is a need for a method for adjusting the temperature of an indoor space by reflecting environmental information.

DISCLOSURE OF INVENTION

Technical Problem

The present invention has been made to solve the above problems. The present invention proposes a method for determining setting temperature control information by using both environmental information and a user's temperature setting pattern. In addition, the present invention proposes a method for controlling the temperature of an indoor space by using both the determined setting temperature control information and predicted environmental information.

Solution to Problem

According to the present invention, a temperature control method comprises steps of setting a control duration which is a time duration for controlling a setting temperature of a specific space, collecting predicted weather information and user's setting temperature information according to weather information for each control duration, determining setting temperature control information for each control duration, based on the collected setting temperature information, and controlling the setting temperature of the specific space, based on the setting temperature control information determined for each control duration and the predicted weather information.

According to the present invention, a temperature control device comprises a communication unit configured to perform communication with other device, and a controller configured to set a control duration which is a time duration for controlling a setting temperature of a specific space, to collect predicted weather information and user's setting temperature information according to weather information for each control duration, to determine setting temperature control information for each control duration, based on the collected setting temperature information, and to control the setting temperature of the specific space, based on the setting temperature control information determined for each control duration and the predicted weather information.

Advantageous Effects of Invention

According to an embodiment of the present invention, it is possible to determine setting temperature control information based on temperature information (hereinafter referred to as setting temperature information) set by a user in accordance with weather information and then automatically control a temperature of an indoor space by using the setting temperature control information and reflecting the weather information. It is therefore possible to reduce energy consumption, improve user's convenience, and increase user's satisfaction.

BRIEF DESCRIPTION OF DRAWINGS

FIGS. 5B and 5C illustrate a process of determining setting temperature control information according to an embodiment of the present invention.

MODE FOR THE INVENTION

Figure 1A:
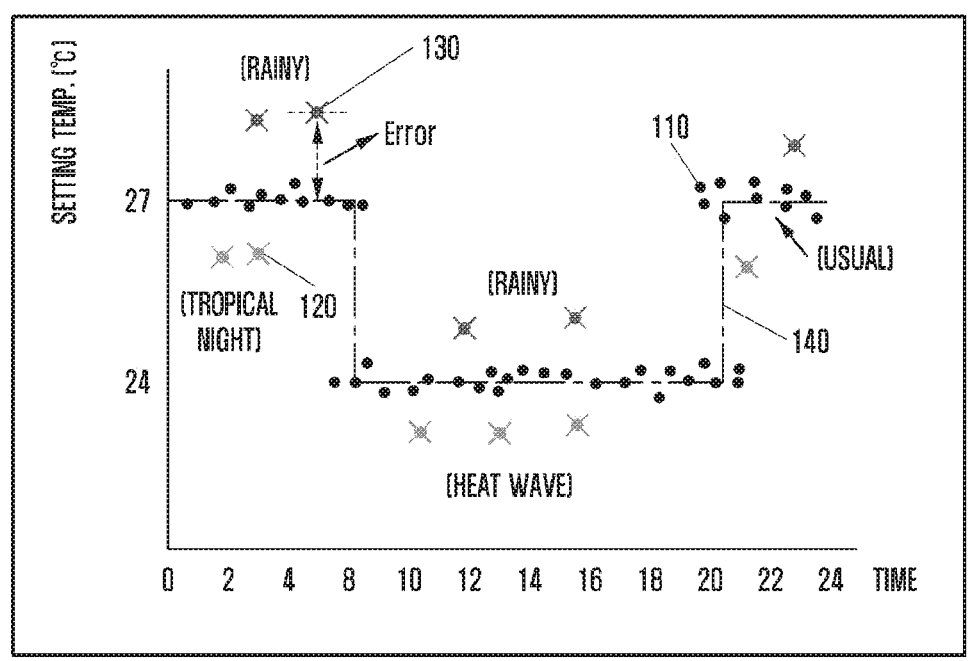
FIG. 1A is a diagram illustrating setting temperature information according to time and setting temperature control information determined using the setting temperature information.

Hereinafter, embodiments of the present invention will be described with reference to the accompanying drawings.

In the following description of embodiments, descriptions of techniques that are well known in the art and not directly related to the present invention are omitted. This is to clearly convey the subject matter of the present invention by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the present invention and the manner of achieving them will become apparent with reference to embodiments described in detail below with reference to the accompanying drawings. The present invention may, however, be embodied in many different forms and should not be construed as limited to embodiments set forth herein. Rather, these embodiments are provided so that this disclosure will be thorough and complete, and will fully convey the scope of the invention to those skilled in the art. To fully disclose the scope of the invention to those skilled in the art, and the invention is only defined by the scope of claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

FIG. 1 is a diagram illustrating setting temperature control information according to the present invention.

FIG. 1A is a diagram illustrating setting temperature information according to time and setting temperature control information determined using the setting temperature information.

Referring to FIG. 1A, the setting temperature information may be shown as 110, 120, and 130. A server may collect information about an indoor temperature, as the setting temperature information 110, 120, and 130, set by a user according to time. The setting temperature information 110, 120, and 130 may include user input information for controlling a temperature adjusting device (e.g., temperature setting information of an air conditioner or temperature setting information of a heater) or indoor space temperature information measured through such control.

The server may generate the setting temperature control information 140 by using the collected setting temperature information 110, 120, and 130.

In case of the setting temperature control information 140 shown in the drawing, the server may set the temperature of an indoor space to 27 degrees before 10 o'clock and after 22 o'clock. In addition, the server may set the temperature of an indoor space to 24 degrees between 10 o'clock and 22 o'clock.

However, when the setting temperature control information is determined based on the setting temperature information over time, there is a problem incapable of reflecting a variation of an outdoor temperature.

For example, since a rainy day may have a temperature lower than usual, the user may set an indoor temperature to be higher than usual as indicated by the setting temperature information 130. Also, when an outdoor temperature is higher, such as a tropical night or a heat wave, than usual, the user may set the indoor temperature to be lower than usual as indicated by the setting temperature information 120. However, in case of using the predetermined setting temperature control information 140, this fails to reflect a variation of outdoor temperature, and thus the user may suffer inconvenience having to reset the indoor temperature in consideration of the outdoor temperature. Further, in case of failing to adequately cope with a variation of outdoor temperature, this may cause a reduction in user's comfort and an energy loss.

That is, when the outdoor temperature is varied, the user should reset the setting temperature, and this may result in the energy loss and user's inconvenience.

Therefore, a method for controlling the setting temperature by reflecting the outdoor temperature is required.

Figure 1B:
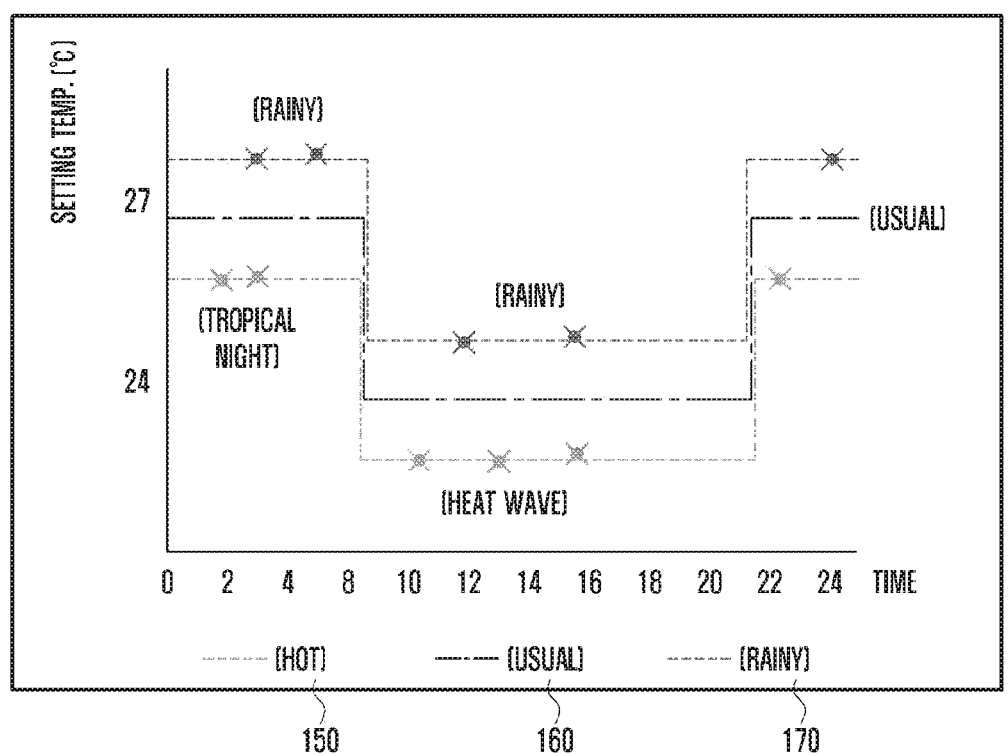
FIG. 1B is a diagram illustrating setting temperature control information generated by reflecting an outdoor temperature according to an embodiment of the present invention.

FIG. 1B is a diagram illustrating setting temperature control information generated by reflecting an outdoor temperature according to an embodiment of the present invention.

Referring to FIG. 1B, the setting temperature control information according to an embodiment of the present invention may be determined differently depending on the outdoor temperature.

The setting temperature control information of usual day 160 indicates the setting temperature control information on a reference day. In this disclosure, the reference day may refer to a day on which a setting temperature pattern can be modeled only by scheduling regardless of weather.

The setting temperature control information of a hot day 150 indicates the setting temperature control information on a day having a higher outdoor temperature than the reference day. Also, the graph 170 indicates the setting temperature control information on a day having a lower outdoor temperature than the reference day.

Like three kinds of setting temperature control information 150, 160, and 170, the setting temperature is determined to be lower as the outdoor temperature is higher. Thus, the server may adaptively control the setting temperature in accordance with both the outdoor temperature and the setting temperature control information. This figure merely shows one example of the setting temperature control information, and the setting temperature control information may be subdivided according to the range of the outdoor temperature. Details will be described later.

As described above, the server may determine the setting temperature control information reflecting the outdoor temperature and also control the indoor temperature in consideration of the outdoor temperature, thus increasing user's convenience and energy efficiency.

Meanwhile, although a device for generating the setting temperature control information and controlling the indoor temperature is described as the server in this embodiment, this is exemplary only and not to be construed as a limitation. Alternatively, for example, an electronic device selected as a master device or a gateway located in a certain indoor space may generate the setting temperature control information and control the indoor temperature.

In addition, although an indoor space is described exemplarily in this disclosure, embodiments of the present invention are not limited to such an indoor space and may be applied to any other specific space. Thus, in the following description, user's occupancy or presence in a room or space may mean that the user is located in a certain particular space which is not limited to an indoor space.

Figure 2:
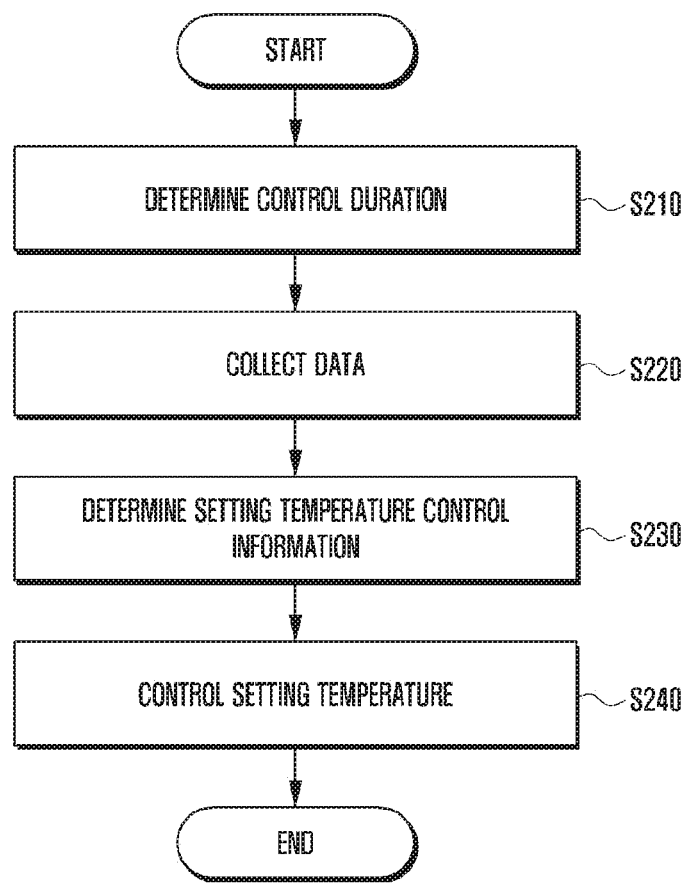
FIG. 2 is a diagram illustrating a method for controlling a temperature of an indoor space according to an embodiment of the present invention.

FIG. 2 is a diagram illustrating a method for controlling a temperature of an indoor space according to an embodiment of the present invention.

Referring to FIG. 2, the server may determine a control duration at step S210. The control duration may refer to a time duration divided for controlling the temperature of an indoor space. The reason for determining the divided control duration is that it is necessary to control the temperature of an indoor space differently according to a daily time zone or a user's state even for the same outdoor temperature.

For example, even when the outdoor temperature is unvaried at 30 degrees, the setting temperature may be determined to be higher in case of a user's absence than in case of a user's presence. This temperature control may increase energy efficiency.

The server may determine the control duration, based on a predetermined rule. As described in the above example, the server may determine the control duration, depending on whether the user is present or absent. Alternatively, the server may determine the control duration, based on the daily maximum temperature.

In addition, the control duration is not a fixed value and may be changed dynamically. The server may predict the subsequent control duration in each control duration. If the predicted control duration is different from an actual control duration, this may be utilized for predicting the next control duration. Also, the server may omit this step of determining the divided control duration. Details will be described later.

In addition, since the setting temperature in the setting temperature control information may be changed on the basis of the control duration, each boundary of the control duration may be used interchangeably with a setting temperature change time.

The server that determines the control duration may collect, at step S220, data for determining the setting temperature control information. The collected data may include setting temperature information according to environmental information for each control duration. The environmental information may include a value or statistics of outdoor temperature, outdoor humidity, outdoor sensory temperature, or indoor sensory temperature. Additionally or alternatively, the environmental information may include the number of occupants, or the like. In this disclosure, the terms environmental information and weather information may be used interchangeably. In addition, although an outdoor temperature is used herein as an example of weather information, this is exemplary only. Further, the server may collect predicted weather information to control the temperature of the indoor space.

At step S230, the server may determine the setting temperature control information by using the setting temperature information according to the collected weather information. At this time, the server may determine the setting temperature control information for each control duration. That is, the server may determine the setting temperature control information by collecting, in each control duration, the predetermined number of data or more or data for the predetermined number of days or more. For example, the server may collect data for three or more days.

In addition, if received setting temperature information differs from the setting temperature control information, the server may update or change the setting temperature control information by reflecting the received setting temperature information.

Details of determining the setting temperature control information will be described later.

The server that determines the setting temperature control information may control the setting temperature of the indoor space at step S240 by using the setting temperature control information. At this time, the server may use the predicted outdoor temperature. Specifically, the server may predict the next setting temperature change time, predict the outdoor temperature in the next control duration, and control the temperature of the indoor space according to the predicted outdoor temperature. At this time, the server may use a weather forecast to predict the outdoor temperature of the next control duration.

If a difference between the predicted outdoor temperature of the next control duration and an actual outdoor temperature measured by a sensor is greater than a predetermined value, the server may control the temperature of the indoor space by reflecting the actual outdoor temperature. This is because, if the difference between the predicted temperature and the actual outdoor temperature is great, the user may face a situation having to control again the setting temperature again.

The server may control the temperature of the indoor space while repeating the above-described process.

Figure 3A:
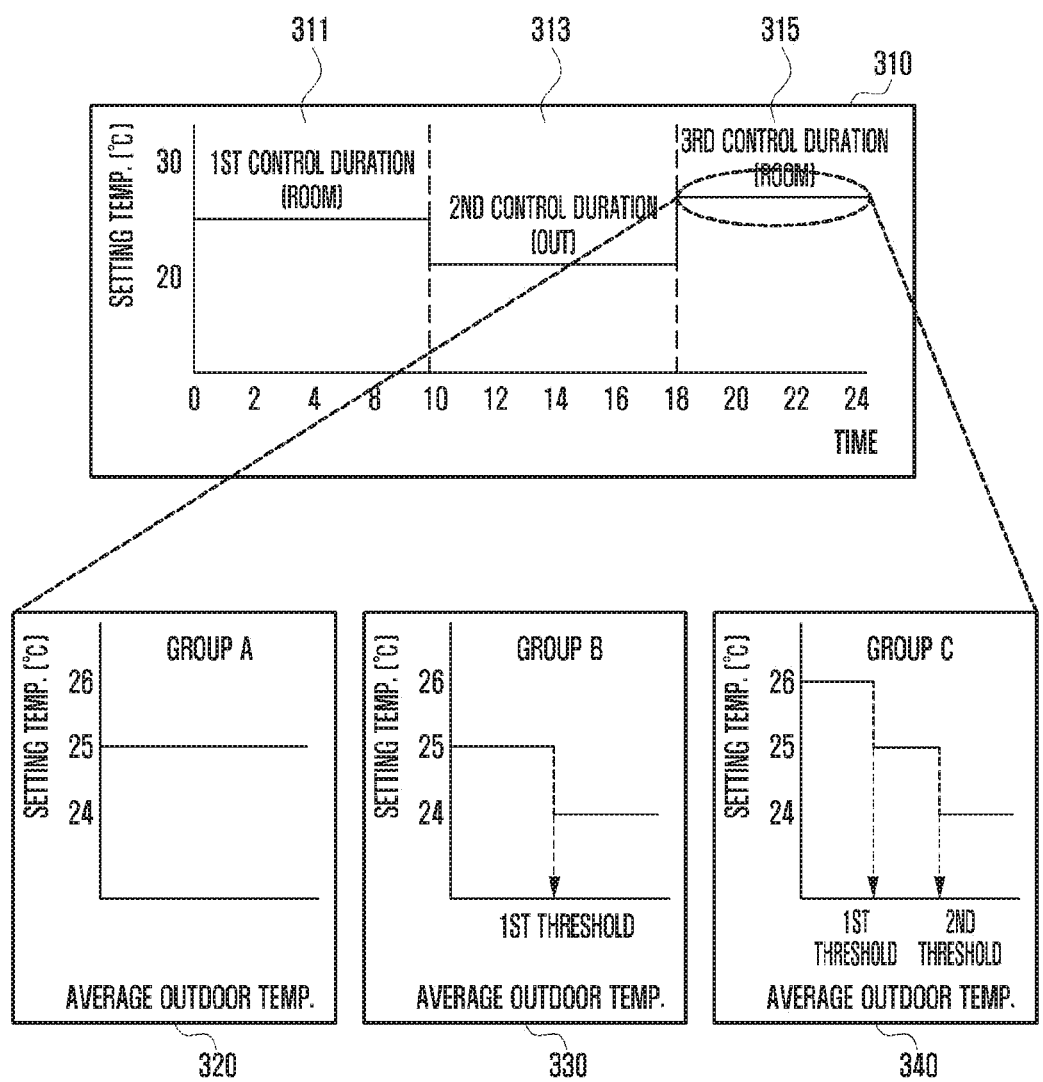
FIG. 3A is a diagram illustrating a control duration determined based on a user's presence or absence, and setting temperature control information determined for each control duration.

FIG. 3A is a diagram illustrating a control duration determined based on a user's presence or absence, and setting temperature control information determined for each control duration.

Referring to FIG. 3A, the server may determine the control duration, based on whether the user is present or not in an indoor space. That is, using a sensor located in the indoor space, the server may acquire information related to a user's presence time and a user's absence time. Then, using this information, the server may determine the control duration.

For example, as shown in FIG. 3A, by recognizing that the user is absent from 10, the server may determine a first control duration 311 from 0 to 10 o'clock for which the user is present, a second control duration 313 from 10 to 18 o'clock for which the user is absent, and a third control duration from 18 to 24 o'clock for which the user is present. This is exemplary only, and the control durations may be determined in various ways.

The server may predict the next setting temperature change time, based on the determined control duration. Then, the server may predict an average outdoor temperature until the next setting temperature change time (or the next control duration) and thereby control the setting temperature of an indoor unit.

However, a user's presence or absence may be varied moment by moment. Therefore, when any information other than the predicted setting temperature change time is received more than a predetermined number of times, the server may reset the control duration by reflecting this information.

In addition, when any unusual event occurs, for example, when the user catching cold is present all day or when the user is absent all day due to a trip, the server may separately collect related data. In this case, using the collected data on the unusual event, the server may determine the setting temperature control information and then control the setting temperature of the indoor unit.

A method for determining the control duration is not limited to the above example. In another example, the server may determine the control duration as a sleeping time, a room-staying time, and an outgoing time. In this case, using the sensor, the server may distinguish the room-staying time from the outgoing time and also determine, as the sleeping time, a time for which no user's movement is recognized during the room-staying time. The number of control durations may be changed.

The server may determine the setting temperature control information in each control duration, and the setting temperature control information in each control duration may be shown as a graph 310.

For the second control duration in which the user is out, the server may set the temperature to be lower than the other control durations, thereby reducing energy consumption. However, the graph of this figure is merely one example, and it is possible in case of summer to set the temperature to be higher in the second control duration than the other control durations.

Further, as indicated by 320, 330, and 340, the setting temperature control information in each control duration may be determined depending on the outdoor temperature.

In case of the setting temperature control information 320, the setting temperature may be maintained uniformly regardless of a variation of the average outdoor temperature. For example, when the user does not change the setting temperature according to a variation of the outdoor temperature, the setting temperature control information may be determined as the setting temperature control information 320 of a group A.

In case of the setting temperature control information 330, the server may set the setting temperature to a predetermined first temperature (e.g., 24 degrees) when the average outdoor temperature exceeds a first threshold value, and also set the setting temperature to a predetermined second temperature (e.g., 25 degrees) when the average outdoor temperature does not exceed the first threshold value. In this case, the predetermined first temperature may be set to be lower than the predetermined second temperature.

In case of the setting temperature control information 340, the server may set the setting temperature to a predetermined first temperature (e.g., 24 degrees) when the average outdoor temperature exceeds a second threshold value. Further, when the average outdoor temperature does not exceed the second threshold value and exceeds the first threshold value, the server may set the setting temperature to a predetermined second temperature (e.g., 25 degrees). Further, when the average outdoor temperature does not exceed the first threshold value, the server may set the setting temperature to a predetermined third temperature (e.g., 26 degrees).

Since the setting temperature control information is determined through a user's setting temperature depending on to the outdoor temperature, it may be changed variously according to user's temperature setting.

Figure 3B:
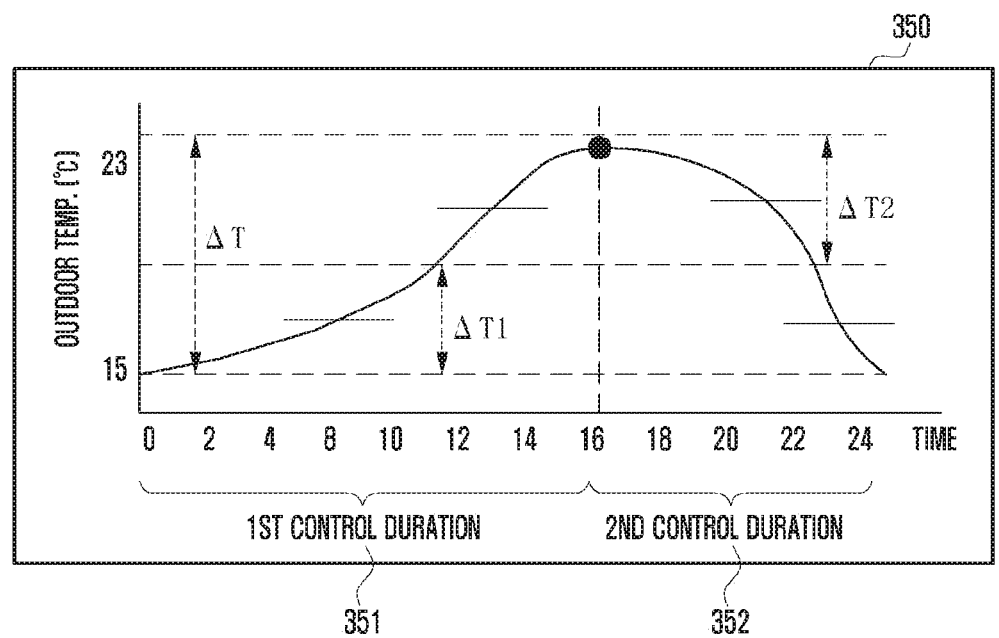
FIG. 3B is a diagram illustrating a method for determining a control duration based on the highest temperature during a day.
Figure 3B:
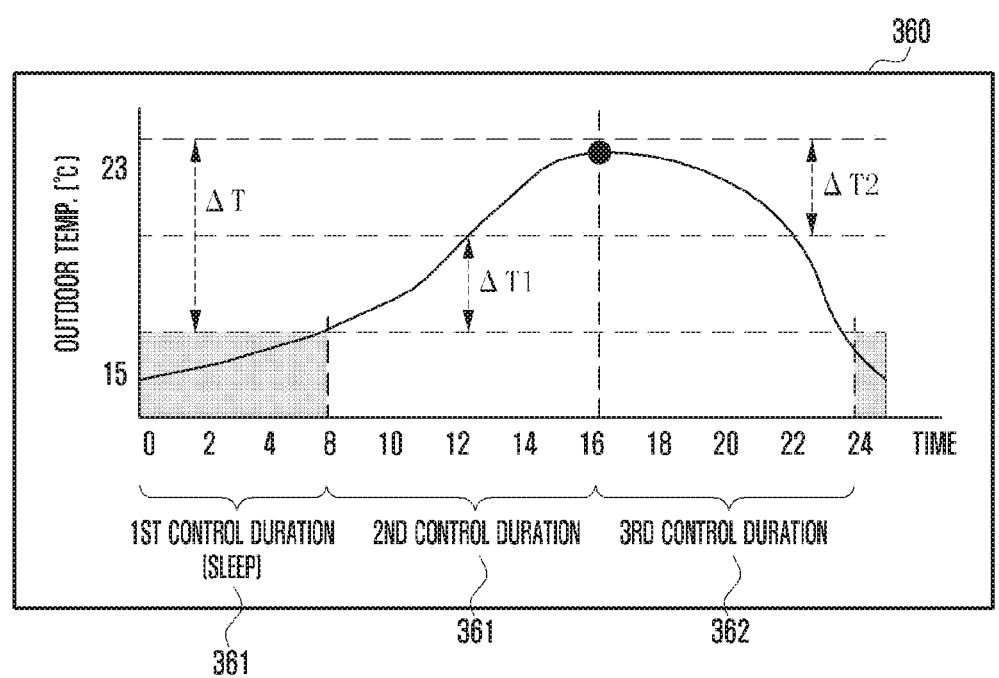

FIG. 3B is a diagram illustrating a method for determining a control duration based on the highest temperature during a day.

When the user is present in a certain space such as office or home for a whole day, the server may determine the control duration, based on the daily highest temperature.

Referring to FIG. 3B, a graph 350 shows an outdoor temperature according to time. Also, this graph 350 shows an example of separating a first control duration 351 and a second control duration 352 on the basis of the maximum temperature. In this case, the maximum temperature may be determined based on the highest among temperatures measured by an externally located sensor or the highest among temperatures measured in the room.

Meanwhile, the server may determine the control duration by using a difference ($\Delta T$) between the maximum and minimum temperatures. For example, the server may separate the control durations by using halves ($\Delta T_1$ and $\Delta T_2$) of the above difference ($\Delta T$).

Unlike the graph 350 shown in FIG. 3B, the server may separate a first control duration ranging from 0 o'clock of the minimum temperature to 12 o'clock of an increased temperature $\Delta T_1$, a second control duration ranging from 12 o'clock to 16 o'clock of the maximum temperature, a third control duration ranging from 16 o'clock to 22 o'clock of a reduced temperature $\Delta T_2$, and a fourth control duration ranging from 22 o'clock to 24 o'clock.

Alternatively, the server may separate a first control duration ranging from 0 o'clock of the minimum temperature to 12 o'clock of an increased temperature $\Delta T_1$, a second control duration ranging from 12 o'clock to 22 o'clock, and a third control duration ranging from 22 o'clock to 24 o'clock.

In addition, referring to a graph 360 of FIG. 3B, the server may determine the control duration in consideration of a user's sleeping time. That is, if any movement is not detected even while the user is in the room, the server may determine that the user is sleeping.

Thus, the server may separate a first control duration 361 ranging from 24 o'clock to 8 o'clock, which is determined that the user is asleep, a second control duration ranging from 8 o'clock to 16 o'clock of the maximum temperature, and a third control duration 363 ranging from 16 o'clock to 24 o'clock.

In addition, the server may consider a current time zone to determine the control duration.

The above-mentioned time is merely an example, and the control duration may be changed. Also, as described above, the number of control durations and the determination method may be changed according to a predetermined rule.

Figure 3C:
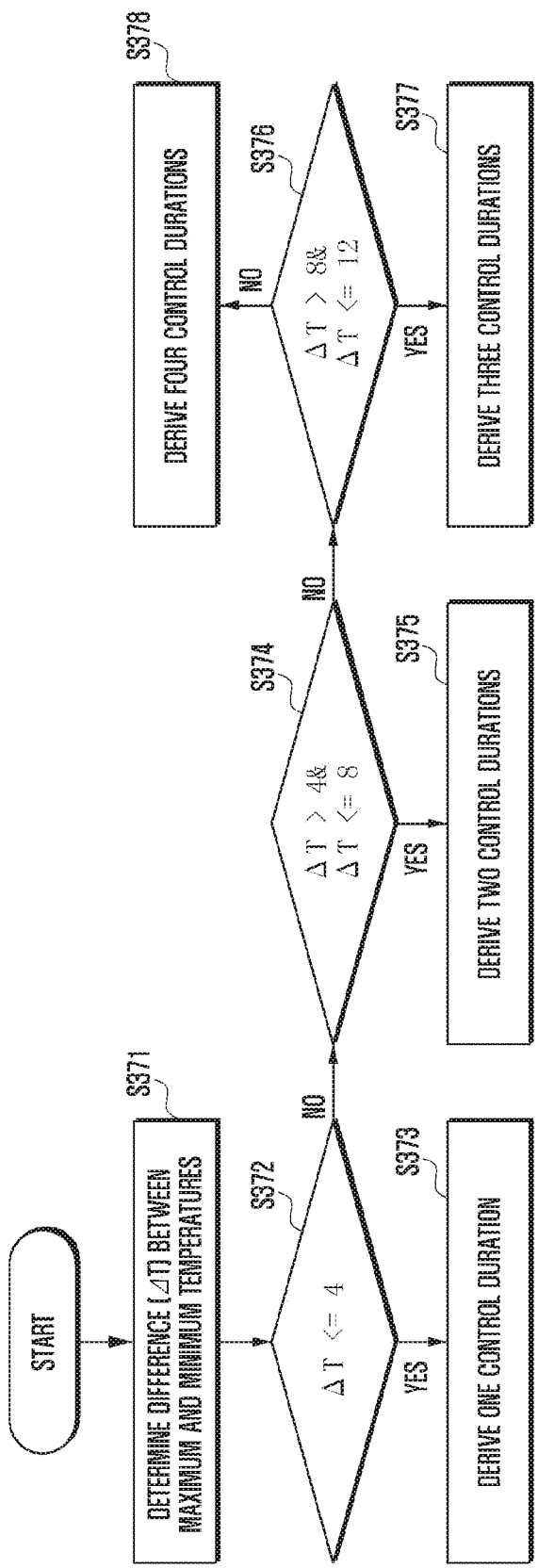
FIG. 3C is a flow diagram illustrating a method for determining a control duration based on the highest temperature during a day.

FIG. 3C is a flow diagram illustrating a method for determining a control duration based on the highest temperature during a day.

Referring to FIG. 3C, the server may determine a difference ($\Delta T$) between the minimum and maximum temperatures at step S371. At this time, the server may use the temperature difference ($\Delta T$) predicted using received weather forecast information.

After determining the temperature difference ($\Delta T$), the server may determine at step S372 whether the temperature difference ($\Delta T$) is smaller than a predetermined temperature difference. In this embodiment, for convenience of explanation, it is assumed that the predetermined temperature difference is 4° C. This is, however, exemplary only and not to be construed as a limitation. The server may calculate an average daily temperature difference and, based thereon, determine the predetermined temperature difference.

If it is determined that the temperature difference ($\Delta T$) is smaller than 4° C., the server may derive one control duration at step S373.

On the other hand, if it is determined that the temperature difference ($\Delta T$) is greater than 4° C., the server may determine at step S374 whether the temperature difference ($\Delta T$) is smaller than 8° C. If it is determined that the temperature difference ($\Delta T$) is smaller than 8° C., the server may derive two control durations at step S375.

If it is determined that the temperature difference ($\Delta T$) is greater than 8° C., the server may determine at step S376 whether the temperature difference ($\Delta T$) is smaller than 12° C. If it is determined that the temperature difference ($\Delta T$) is smaller than 12° C., the server may derive three control durations at step S377.

If it is determined that the temperature difference ($\Delta T$) is greater than 12° C., the server may derive four control durations at step S378.

As described above, the server may compares the difference between the maximum and minimum temperature with predetermined values, and increase the number of control durations as the difference is large.

Although the control duration is described as being increased one by one in this embodiment, the number of control durations to be increased may be changed.

Figure 3D:
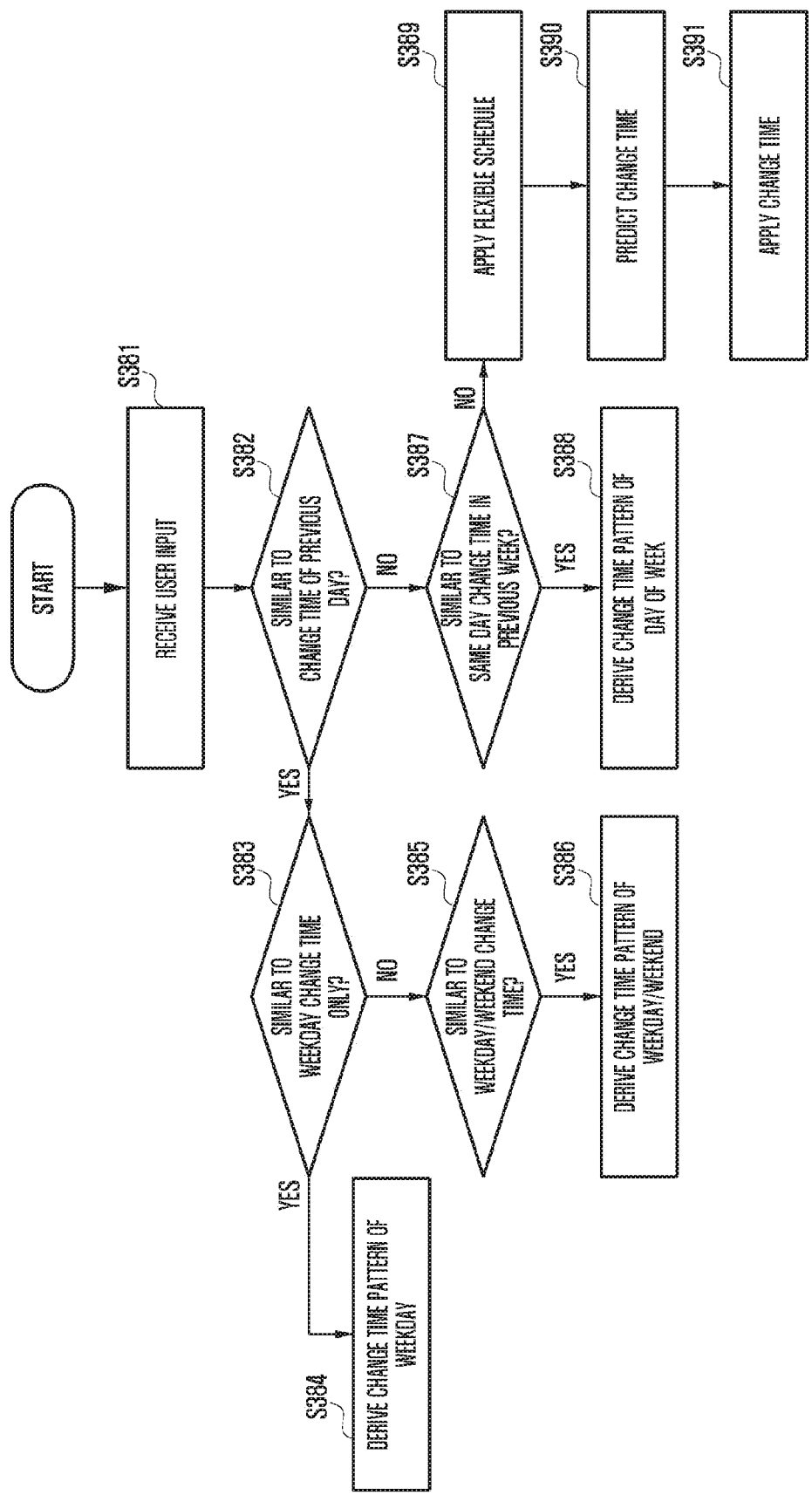
FIG. 3D is a flow diagram illustrating a method for predicting a change time according to an embodiment of the present invention.

FIG. 3D is a flow diagram illustrating a method for predicting a change time according to an embodiment of the present invention.

Referring to FIG. 3D, the server may receive a user's input at step S381.

The server that receives the user input may determine at step S382 whether the setting temperature change time is similar to that of the previous day. At this time, a rule for judging the similarity may be predetermined. For example, when a difference between setting temperature change times is within 30 minutes, the server may determine that the setting temperature change times are similar to each other.

When it is determined that the setting temperature change time is similar to that of the previous day, the server may determine whether it is similar to the change time of weekdays. This is because, if the received setting temperature change time is similar to the setting temperature change time of weekdays, the server can derive a setting temperature change time pattern by using the same value for the setting temperature change time of weekdays.

Thereafter, at step S383, the server may determine whether the setting temperature change time is similar to only that of weekdays. If it is determined that only the setting temperature change time of weekdays is similar, the server may derive a change time pattern of weekdays at step S384.

On the other hand, if only the setting temperature change time of weekdays is not similar, the server may determine at step S385 whether the setting temperature change time of weekend is also similar. If the setting temperature change time of weekend is also similar to that of weekdays, the server may derive a setting temperature change time pattern of weekdays and weekend at step S386.

On the other hand, if it is determined at step S382 that the user input is not similar to the setting temperature change time of the previous day, the server may determine at step S387 whether the user input is similar to the setting temperature change time of the same day of the previous week.

If it is determined to be similar, the server may derive a setting temperature change time pattern for the corresponding day of the week.

As described above, when the setting temperature change time pattern for a specific day of the week, weekdays, or weekdays and weekend is derived, the server may predict the setting temperature change time of the next control duration by using the derived pattern. This method for predicting the setting temperature change time of the next control duration through the setting temperature change time pattern may be referred to as constant scheduling.

On the other hand, if it is determined at step S387 that the user input is not similar to the setting temperature change time of the same day of the previous week, the server may perform flexible scheduling at step S389.

Then, at step S390, the server may predict the setting temperature change time.

For example, the server may compare a given number of user inputs and then utilize a time point having the shortest sum of individual distances as the next setting temperature change time. The given number may be, for example, three.

The sum of individual distances may mean the sum of differences between received setting temperature change times. For example, if 7 o'clock, 8 o'clock, and 9 o'clock are received as inputs, the sum of individual distances from 7 o'clock or from 9 o'clock is 3 hours (i.e., 1 hour plus 2 hours). On the other hand, the sum of individual distances from 8 o'clock is 2 hours (i.e., 1 hour plus 1 hour). Therefore, the server may utilize 8 o'clock as the next setting temperature change time.

In addition, if a gap of occurrence time between the previous event and the current event is smaller than a predetermined time gap, the server may predict the next setting temperature change time by using this. In this embodiment, the predetermined time gap is assumed to be 30 minutes for convenience of explanation.

For example, if an input previously entered as a user's sleep time is 6 hours, 6 hours 10 minutes, 6 hours 15 minutes, 5 hours 50 minutes, 5 hours 45 minutes, or the like, the server may determine that the user's sleep time is 6 hours. Therefore, even if a user's sleeping start time is somewhat irregular, the server may predict the setting temperature change time of the next control duration by using the sleep time.

The server that predicts the setting temperature change time in such ways may predict the average outdoor temperature by using the predicted change time at step S391 and then control the temperature of the indoor space.

Figure 4A:
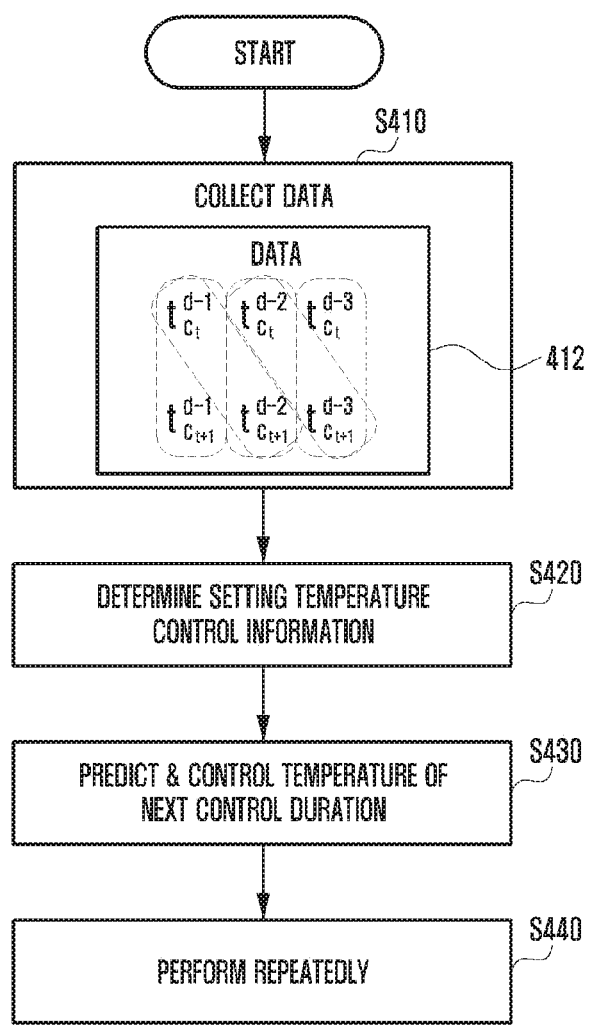
FIG. 4A is a diagram illustrating a method for controlling a temperature of an indoor space according to an embodiment of the present invention.

FIG. 4A is a diagram illustrating a method for controlling a temperature of an indoor space according to an embodiment of the present invention.

At step S410, the server may collect data for determining the setting temperature control information. The data may include setting temperature information related to a user's setting temperature according to an average outdoor temperature. Also, the data may include information for determining a control duration (e.g., information about a user's presence or absence), information related to a setting temperature change time of the previous control duration, and the like.

In addition, the server may collect data a predetermined number of times or data for a predetermined number of days or more. For example, the server may determine the control duration by using information received for at least three days.

Using the received data, the server may determine the setting temperature change time of the next control duration and also determine the setting temperature control information for each control duration.

Although case of separating control durations is explained in this embodiment, this is exemplary only and not to be construed as a limitation.

In this embodiment, the boundaries of first and second control durations may be represented by $t_{c_i}^d$ and $t_{c_{i+1}}^d$, where the superscript d denotes information related to the date. These boundaries of the first and second control durations are values that can be changed according to a user's behavior pattern.

Therefore, the data collected for three days or more may be expressed as indicated by a reference numeral 411.

In the data 412, data between $t_{c_{i-1}}^{d-3}$ and $t_{c_i}^{d-3}$ indicates data collected in the first control duration three days ago. Also, data between $t_{c_i}^{d-3}$ and $t_{c_i}^{d-2}$ indicates data collected in the second control duration three days ago. Also, data between $t_{c_i}^{d-2}$ and $t_{c_{i+1}}^{d-2}$ indicates data collected in the first control duration two days ago, and data between $t_{c_{i+1}}^{d-2}$ and $t_{c_i}^{d-1}$ indicates data collected in the second control duration two days ago. Also, data between $t_{c_i}^{d-1}$ and $t_{c_{i+1}}^{d-1}$ indicates data collected in the first control duration one day before.

That is, the server may collect data in five durations during the previous three days.

Further, the setting temperature change time points, $t_{c_i}^d$ and $t_{c_{i+1}}^d$, which are the boundaries of the first and second control durations, are values that can be changed according to a user's behavior pattern. Therefore, the server may predict the boundary of the next control duration after each control duration is ended and, if a difference between the predicted boundary of the control duration and an actual control duration occurs, may update the control duration.

For example, if the first control duration is set from 9 to 21 o'clock and the second control duration is set from 21 to 9 o'clock depending on weather the user is present or not in a certain space, the server may predict the end time point of the next control duration as 9 o'clock after collecting data in the first control duration. However, if the user is present even after 9 o'clock, the server may update or change the control duration.

The server that collects data for each control duration may determine the setting temperature control information at step S420.

Details of determining the setting temperature control information by the server will be described with reference to FIG. 5.

Then, at step S430, the server may predict the boundary of the next control duration and the average outdoor temperature of the next control duration, and control the temperature by using the predicted average temperature and the setting temperature control information. At this time, the server may predict the average outdoor temperature of the next control duration by weather forecast information.

Meanwhile, if a difference between the predicted outdoor temperature of the next control duration and an actual outdoor temperature measured by a sensor is greater than a predetermined value, the server may control the temperature of an indoor space by reflecting the actual outdoor temperature. This is because, if the difference between the predicted temperature and the actual outdoor temperature is great, the user may face a situation having to control again the setting temperature again.

In addition, if the user changes the setting temperature after the temperature control of the server, the server may update or change the setting temperature control information.

Details of the temperature control of the server using the setting temperature control information will be described with reference to FIG. 4B.

The server may determine the setting temperature control information by repeating the above-described process, and thereby control the setting temperature of an indoor unit.

Figure 4B:
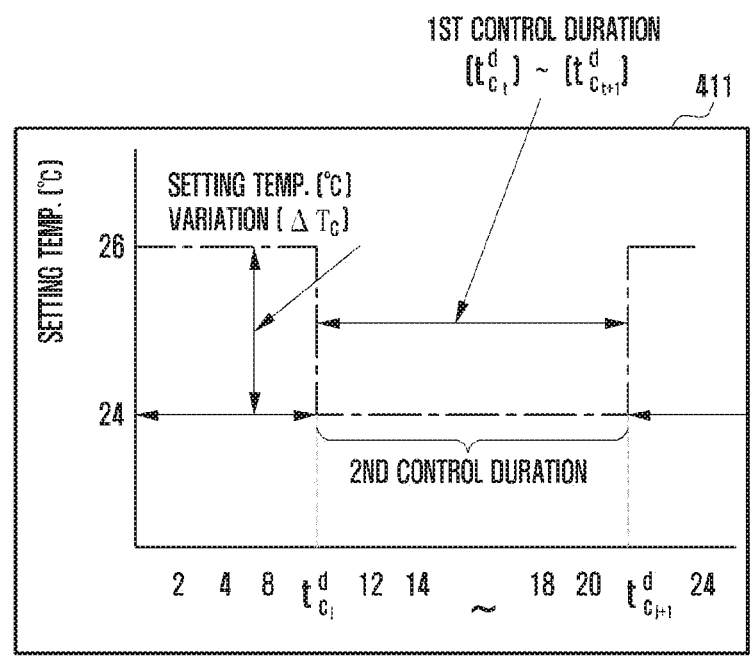
FIG. 4B is a diagram illustrating a method for controlling a temperature by using a control duration prediction method and control information.
Figure 4B:
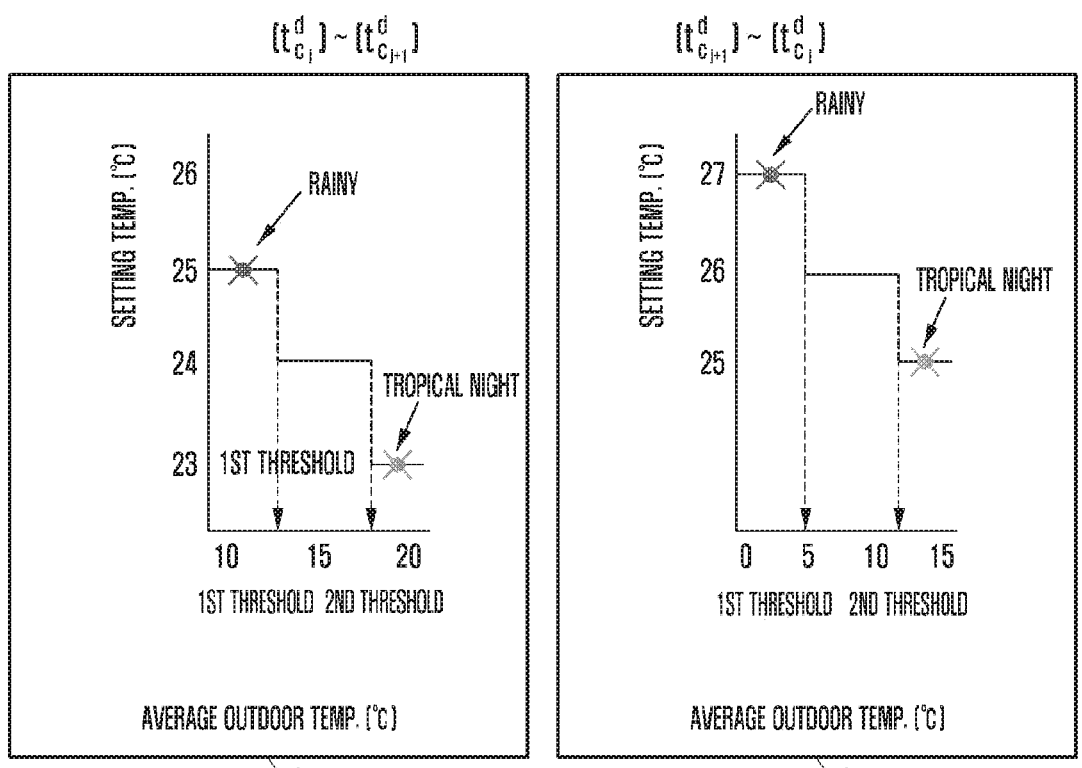

FIG. 4B is a diagram illustrating a method for controlling a temperature by using a control duration prediction method and control information.

Referring to a graph 411, in this embodiment, the control duration may be divided into a first control duration and a second control duration. At the boundaries $t_{c_i}^d$ and $t_{c_{i+1}}^d$ of the control durations, a variation of the setting temperature ($\Delta T_C$) may occur.

The server may predict the next setting temperature change time by using data for a predetermined number of days or more. Details will be described below.

For example, in case of using data of at least three days, the server may predict a start time point $t_{c_{i+1}}^d$ of the next control duration (hereinafter, a second control duration start time) by using Equation 1 at the start $t_{c_i}^d$ of a certain control duration of day (hereinafter, a first control duration start time). In Equation 1, the mark C is used as a value related to $C_{i+1}$ for calculating the second control duration start time. That is, a time point at which the second control duration start time is calculated is the first control duration start time $t_{c_i}^d$, and start time point values of the second control duration ($C_{i+1}$) during the previous three days may be used to calculate the second control duration start time.

$$D_c^{d-1} = |t_c^{d-1} - t_c^{d-2}| + |t_c^{d-1} - t_c^{d-3}|$$

$$D_c^{d-2} = |t_c^{d-2} - t_c^{d-1}| + |t_c^{d-2} - t_c^{d-3}|$$

$$D_c^{d-3} = |t_c^{d-3} - t_c^{d-1}| + |t_c^{d-3} - t_c^{d-2}|$$

$$(t_{c_{i+1}}^d) \sim \min_{t_c^d}(D_c^{d-1}, D_c^{d-2}, D_c^{d-3})$$

[Equation 1]

The server may calculate a difference between the control duration start time of one-previous day and that of each of other previous days, calculate a difference between the control duration start time of two-previous day and that of each of other previous days, and calculate a difference between the control duration start time of three-previous day and that of each of other previous days. In addition, using the minimum value among the calculated values, the server may predict the start time of the control duration at the same control time point of today. Specifically, the server may determine the minimum value D among the calculated values as the second control duration start time $t_{c_{i+1}}^d$.

Alternatively, the server may calculate the setting temperature change time, based on a daily pattern, a weekly pattern, a daily temperature difference, and the like.

Graph 421 and 422 show the setting temperature control information in the first control duration and the setting temperature control information in the second control duration, respectively.

Referring to the graph 421, when the rain falls in the first control duration, a predicted average outdoor temperature may be lower than a first threshold value. Therefore, the server may determine a predicted value of the setting temperature to a predetermined first temperature (e.g., 25 degrees) and then control the temperature according to the setting temperature predicted value.

On the other hand, if a warning of a heat wave is given in the first control duration, the predicted average outdoor temperature may be higher than a second threshold value. Therefore, the server may set the setting temperature predicted value to a predetermined third temperature (e.g., 23 degrees).

Referring to the graph 422, when the rain falls in the second control duration, a predicted average outdoor temperature may be lower than a first threshold value. Therefore, the server may determine a predicted value of the setting temperature to a predetermined first temperature (e.g., 27 degrees) and then control the temperature according to the setting temperature predicted value.

On the other hand, in case of a tropical night in the second control duration, the predicted average outdoor temperature may be higher than a second threshold value. Therefore, the server may set the setting temperature predicted value to a predetermined third temperature (e.g., 25 degrees).

Figure 5A:
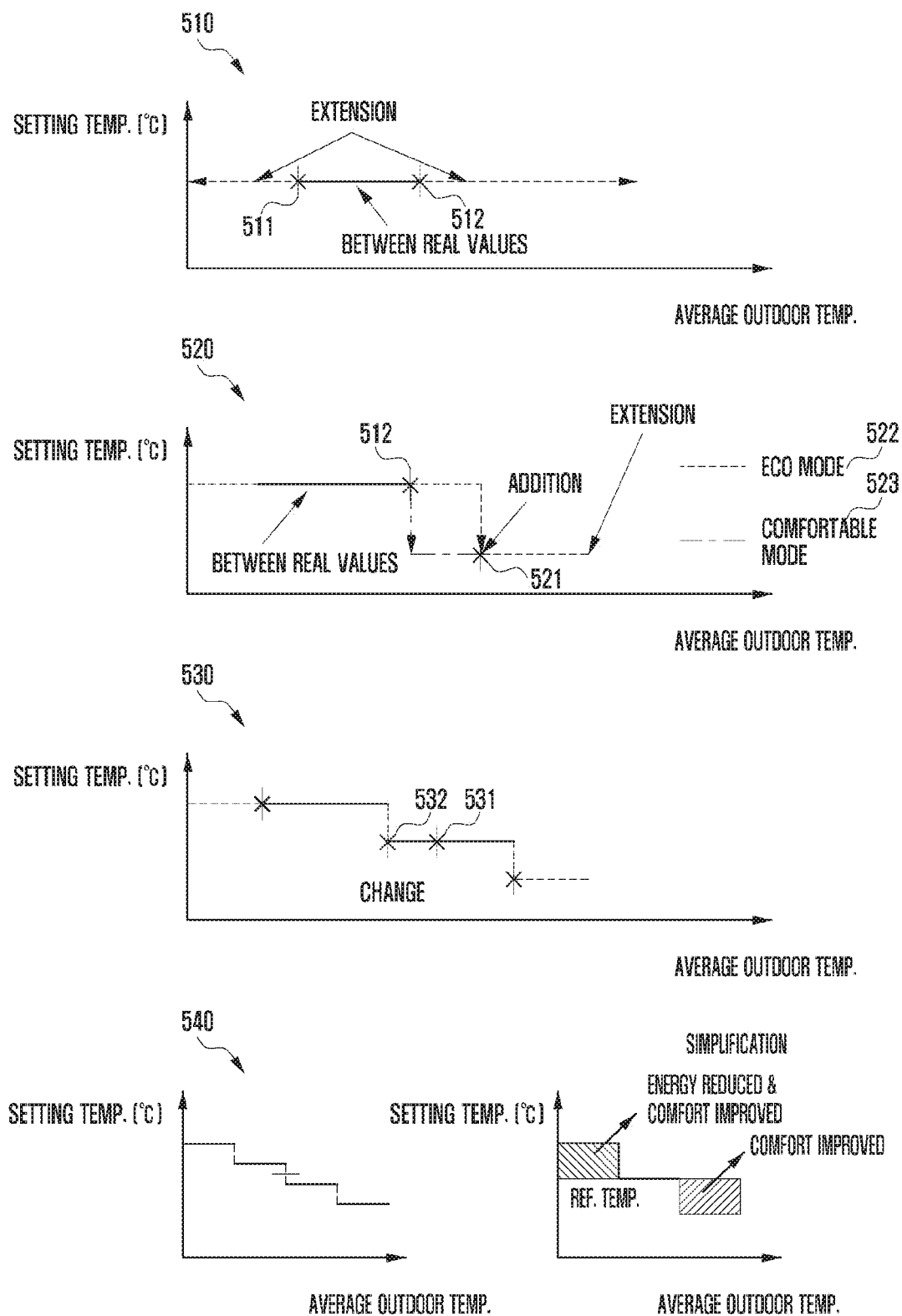
FIG. 5A is a diagram illustrating a process of determining setting temperature control information according to an embodiment of the present invention.

FIG. 5A is a diagram illustrating a process of determining setting temperature control information according to an embodiment of the present invention.

Referring to FIG. 5A, a graph 510 shows a step of determining an initial value of the graph when the setting temperature control information is not determined in advance.

The server may receive setting temperature information for a predetermined number of average outdoor temperatures and arbitrarily extend a setting temperature value to determine the initial setting temperature control information. This step of determining the initial setting temperature control information is referred to as an extension step. Also, the received setting temperature information for determining the initial setting temperature control information is referred to as first setting temperature information.

Referring to the graph 510, the server may receive setting temperature information 511 and arbitrarily extend a setting temperature value of the received setting temperature information 511 along the x-axis to determine the initial setting temperature control information. The server may perform the extension step by using one setting temperature information 511 or two pieces of setting temperature information 511 and 512. In addition, the server may perform the extension step by using two or more pieces of setting temperature information. In case of determining the initial setting temperature control information by using the setting temperature information 511, the server may not change the setting temperature control information if the setting temperature information 512 included in the setting temperature control information is further received. In this case, if received data matches the setting temperature for the average outdoor temperature in the setting temperature control information, the server may determine that the received data is included in the setting temperature control information.

Thereafter, when second setting temperature information that is not included in the setting temperature control information is received, the server may perform an addition step of the setting temperature control information by reflecting the received second setting temperature information. Alternatively, the second setting temperature information may be stored in advance in the server and used in determining the setting temperature control information.

In this case, the second setting temperature information may mean setting temperature information for an duration other than a specific duration (between real values in this drawing) in which already received setting temperature information exists.

Referring to a graph 520, since new setting temperature information 521 is not contained in the duration between the setting temperature information 511 and the setting temperature information 512 which have been received, the server may perform the addition step of the setting temperature control information.

At this time, depending on a setting temperature information generation mode, the server may perform the addition step of the setting temperature control information. For example, the server may have an eco mode 522 and a comfort mode 523 as the setting temperature information generation mode, and the server may perform the addition step by using different methods for the eco mode 522 and the comfort mode 523. The eco mode is a mode for saving energy, and the comfort mode is a mode for enhancing user's comfort. The eco mode 522 and the comfort mode 523 may be set in advance or set by the user.

In this embodiment, the setting temperature control information is assumed to be determined in summer, for example. The eco mode and the comfort mode may be changed according to seasonal characteristics. For example, in winter, the eco mode may refer to a mode lowering the setting temperature in a situation where the average outdoor temperature does not increase much. That is, in case of winter, the graph 523 may become the eco mode, and the graph 522 may become the comfort mode.

In the eco mode 522, the server may determine the setting temperature control information such that the setting temperature is reduced at the average outdoor temperature of the setting temperature information 521 while being maintained up to the average outdoor temperature of the setting temperature information 521. On the other hand, in the comfort mode 523, the server may determine the setting temperature control information such that the setting temperature is immediately reduced at the average outdoor temperature of the setting temperature information 512.

Thereafter, the server may perform the extension step so that the control with the same setting temperature is performed even above the average outdoor temperature of the setting temperature information 521.

As shown in the graph 520, in the addition step, the setting temperature control information is set as a rightward-downward graph in which the setting temperature becomes lower as the outdoor temperature becomes higher. However, in some cases, the setting temperature control information may be set as a rightward-upward graph in which the setting temperature becomes higher as the outdoor temperature becomes higher. This rightward-upward graph may need receiving two or more pieces of setting temperature information in which the setting temperature becomes higher as the external temperature increases. This is to prevent an error that the setting temperature control information is changed even when any erroneous setting temperature information is received.

Thereafter, when a third setting temperature information different from the existing setting temperature information included in the setting temperature control information is received in an duration in which the setting temperature information exists, the server may perform a step of changing the setting temperature control information, based on the third setting temperature information. Through this change step, the server may determine the setting temperature control information as shown in a graph 530.

For example, when two pieces of setting temperature information 531 and 532 are received as the third setting temperature information different from information included in the existing setting temperature control information, the server may change a graph by reflecting the received setting temperature information. That is, when the setting temperature of the setting temperature information 532 is smaller than that of the existing setting temperature control information, the server may change a value of the setting temperature at the outdoor temperature in the setting temperature information 532 and then update the setting temperature control information by extending the value.

Also, in order to prevent excessive control, the server may determine the setting temperature control information by performing a simplification step of the setting temperature control information as shown in a graph 540. That is, if the setting temperature information according to the average outdoor temperature is all reflected, the setting temperature information may be changed excessively even with a small change in the outdoor temperature. Thus, through a simplification process, the server may derive the graph 540.

In case where the temperature of an indoor space is controlled according to the setting temperature control information as compared with other case where the setting temperature is maintained uniformly to a reference temperature, the setting temperature may be set higher than the reference temperature when the outdoor temperature is low. Even though the setting temperature is set higher than the reference temperature, the user's comfort is not reduced and energy can be saved since the outdoor temperature is low. On the other hand, when the outdoor temperature is high, the setting temperature may be set lower than the reference temperature to improve the user's comfort.

FIG. 5B is a flow diagram illustrating a process of determining setting temperature control information according to an embodiment of the present invention.

Referring to FIG. 5B, when new setting temperature information is received, the server may determine at step S551 whether there is setting temperature control information. That is, the server may determine whether it is a process of initially generating the setting temperature control information.

In case of initially generating the setting temperature control information, the server may perform the extension step at step S552 by using the received input. As described above, the extension step may include determining a certain graph by extending the received input. This is shown in a graph 570 of FIG. 5C.

Figure 5C:
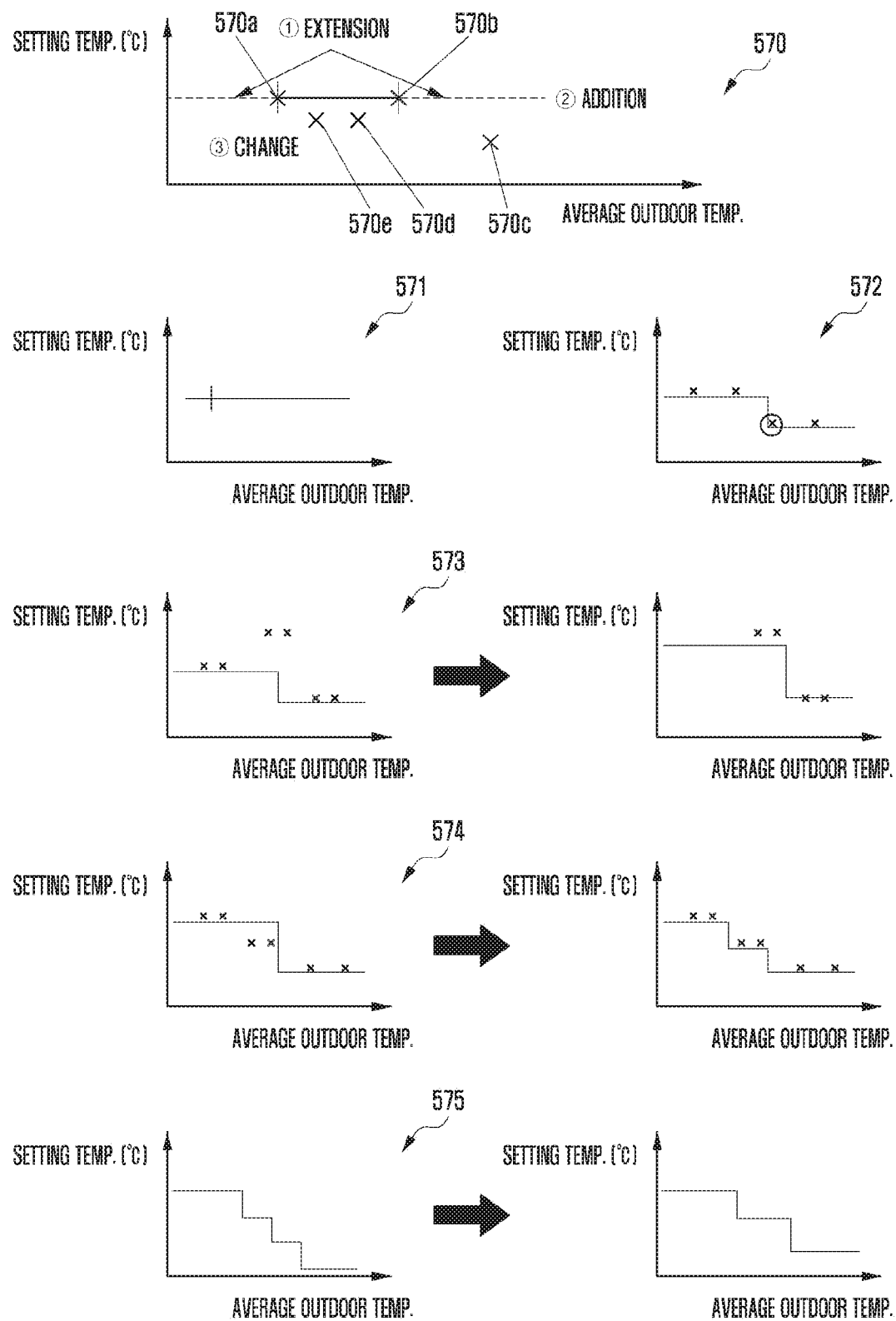

Referring to the graph 570 of FIG. 5C, when an input 570a is received, the server may arbitrarily extend a setting temperature value of the received input 570a and thereby determine the setting temperature control information. At this time, even if another input 570b is received, the server may not change the setting temperature control information.

The setting temperature control information generated as a result of the extension may be determined as shown in a graph 571 of FIG. 5C.

Returning to FIG. 5B, if there is any setting temperature control information previously generated, the server may determine at step S553 whether the received input is new setting temperature information. Specifically, in order to determine whether the received input is new setting temperature information, the server may determine whether an outdoor temperature and setting temperature of the received input are included in previously received inputs.

If it is determined that the received input is new setting temperature information, the server may perform addition and extension at step S554.

This step may include, when new setting temperature information not included in the existing setting temperature control information graph is received, steps of adding and extending a region of the setting temperature control information graph by using the received setting temperature information.

Referring to the graph 570 of FIG. 5C, when a new input 570c is received, this input is not information contained between previously received inputs. Therefore, the server may add and extend the setting temperature control information by reflecting this new input. The added and extended setting temperature control information may be determined as shown in a graph 572 of FIG. 5C.

On the other hand, if it is determined that the received input is not new setting temperature information, that is, if an outdoor temperature of the received input is included in an outdoor temperature range of the existing setting temperature control information, the server may determine at step S555 whether two different inputs occur between real values. That is, the server may determine whether two or more inputs other than the setting temperature control information occur.

If two or more different inputs do not occur, the server may return to step S551 and receive a new input.

On the other hand, if two or more different inputs occur, the server may perform a change at step S556. This change step may include, when two or more different inputs are received, a process of reflecting the received inputs on the setting temperature control information.

Referring to the graph 570 of FIG. 5C, when two or more inputs such as 570d and 570e which are included in the outdoor temperature range of the setting temperature control information but different from the setting temperature control information are received, the server may change the setting temperature control information by reflecting these inputs. The changed setting temperature control information may be determined as shown in a graph 573 or a graph 574.

Then, at step S557, the server may check whether there are two or more setting temperature changed durations of the setting temperature control information. If the changed duration is less than two, the server may determine that it is not necessary to simplify the setting temperature control information, and then receive a new input.

On the other hand, if there are two or more changed durations, the server may check at step S558 whether a difference of the average outdoor temperature between the two new inputs is smaller than a predetermined value. At this time, the predetermined value may be, for example, 5° C.

If the difference of the average outdoor temperature between the two new inputs is smaller than the predetermined value, the server may extend a gap of the new inputs in the direction of the average outdoor temperature at step S559. At this time, the direction of extension may be varied depending on a mode. In this disclosure, the mode may include a first mode and a second mode, and the number of modes may be changed.

For example, when the first mode is an eco mode and the second mode is a comfort mode, the direction of extension is varied depending on whether the mode is the eco mode or the comfort mode (or a bidirectional mode). For example, in the echo mode, the server may move one of the inputs to the right. On the other hand, in the comfort mode, the server may move the two inputs to both sides. In this case, the eco mode may refer to a mode for minimizing a change of the setting temperature. On the other hand, the comfortable mode may refer to a mode in which the setting temperature is changed according to a variation of the outdoor temperature in order to improve the user's comfort.

In addition, the server may determine the direction of extension, depending on whether the mode is a cooling mode or a heating mode. That is, the direction of extension may be different in the heating mode and in the cooling mode.

Thus, the server may determine the direction of extension by considering all modes (whether it is the eco mode or the comfort mode and whether it is the cooling mode or the heating mode).

If the difference of the average outdoor temperature between the two new inputs becomes greater through extension than the predetermined value, the server may determine at step S560 whether a length of the average outdoor temperature in an duration (hereinafter, a setting temperature change duration) between points where the setting temperature is changed is greater than a predetermined value.

If the length of the average outdoor temperature in each setting temperature change duration is greater than the predetermined value, the server does not change the setting temperature control information. On the other hand, if it is small, the server performs the simplification at step S561.

The server may perform a simplification process by dividing the setting temperature change duration having the length of the average outdoor temperature smaller than the predetermined value, and then respectively incorporating the divided durations into both adjacent durations. Also, the simplification process may consider a mode. For example, in the energy saving mode, the simplification process may be performed to increase the setting temperature in case of hot season (summer) and to decrease the setting temperature in case of cold season (winter). A graph derived by the simplification process may be shown as a graph 575 of FIG. 5C. The simplification process will be described in detail with reference to FIG. 6.

Figure 6:
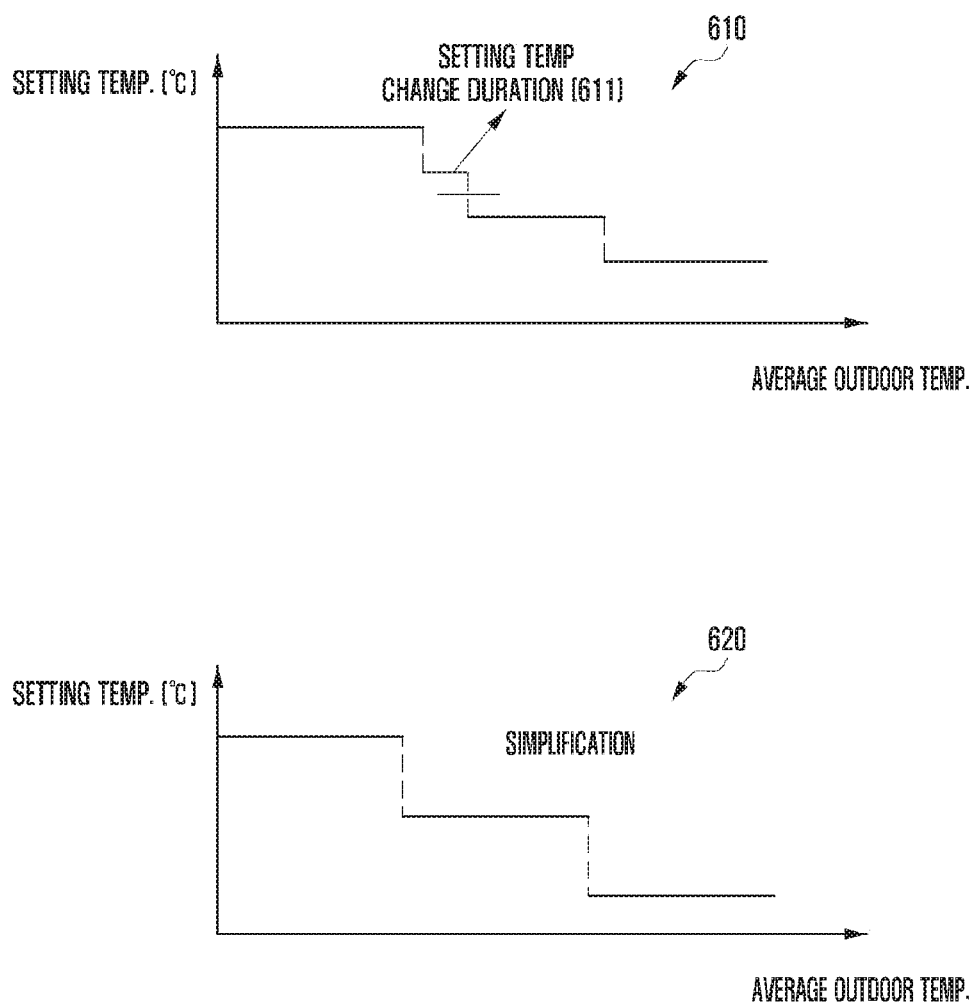
FIG. 6 is a diagram illustrating a process of simplifying setting temperature control information.

FIG. 6 is a diagram illustrating a process of simplifying setting temperature control information.

Referring to a graph 610 of FIG. 6, if the length of the average outdoor temperature in the setting temperature change duration is small, the setting temperature may change frequently according to a variation of the outdoor temperature. This increases energy consumption, so that a simplification process is needed.

Thus, after the step of extending a new input, the server determines a setting temperature change duration in which the length of the average outdoor temperature is smaller than a predetermined value. In this figure, it is assumed that the length of the average outdoor temperature in an duration 611 is smaller than the predetermined value.

Then, the server may divide the setting temperature change duration 611. If such division is made on the basis of a reference temperature, the server may simplify the setting temperature control information by incorporating both sides of the divided setting temperature change duration into both or one of left and right adjacent setting temperature change durations.

Then, using the simplified setting temperature control information and the outdoor temperature, the server may control the temperature of the indoor space.

FIG. 7 is a diagram illustrating the effect of an external environment on an indoor temperature according to another embodiment of the present invention.

The temperature in the indoor space may be affected not only by the outdoor temperature but also by the state of a building and surrounding features. For example, a place adjacent to a window may be higher in temperature than other places due to heat transfer through the window. In addition, depending on the presence of a neighbor building, the orientation of an indoor space, a floor, the heat transmittance or block rate of a window blind, the position or capacity of a temperature control device, or the like, the temperature of some places may be varied according to their positions even in one indoor space.

Figure 7A:
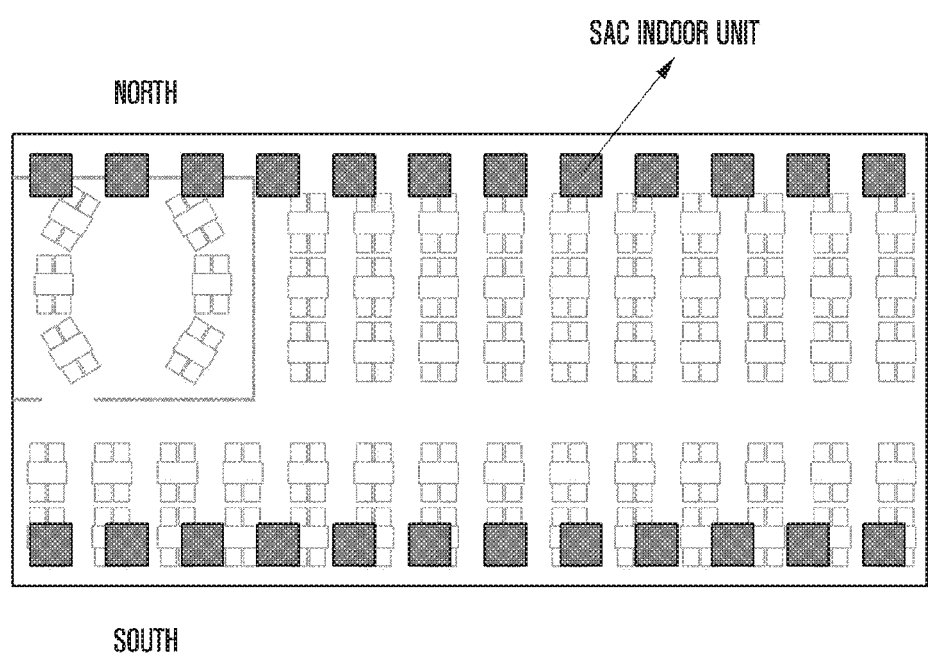
FIG. 7 is a diagram illustrating the effect of an external environment on an indoor temperature according to another embodiment of the present invention.

FIG. 7A shows a building which is not affected by the external environment. Referring to FIG. 7A, there is no neighbor building, and the orientation of the building is due south. Therefore, there is no place that is not affected by the sunlight in the building, and an indoor space of the building may be relatively less influenced by the external environment.

Figure 7B:
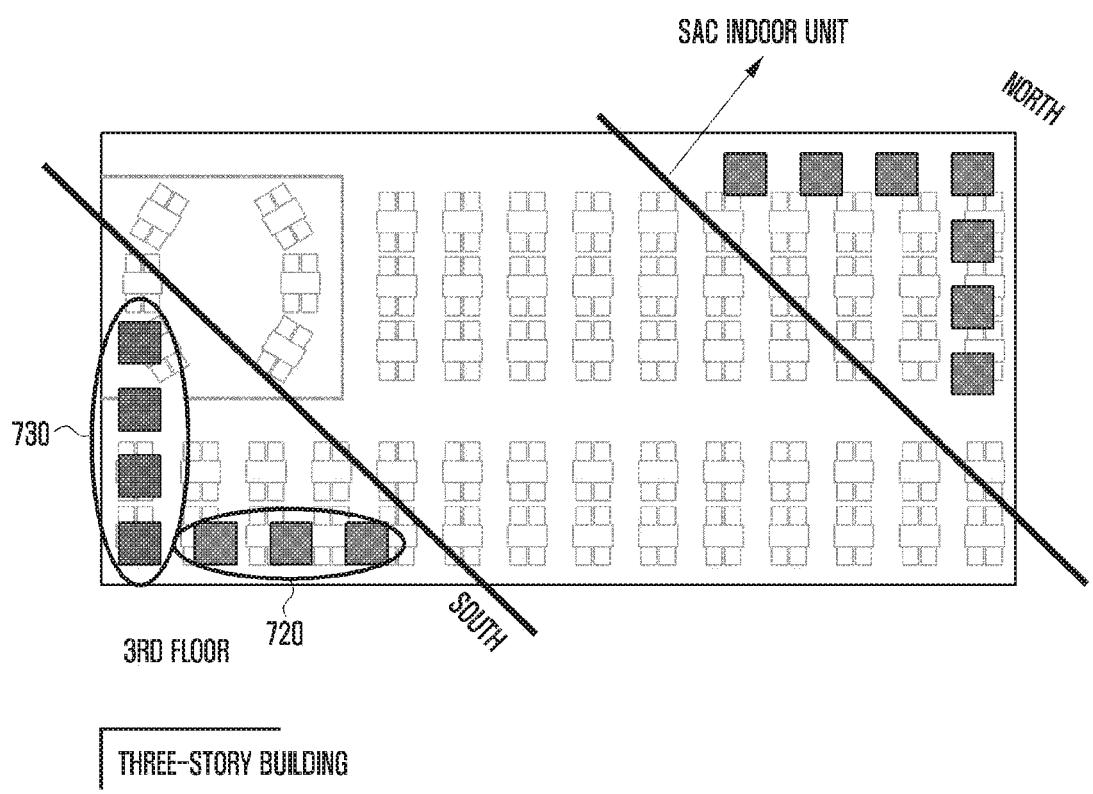

FIG. 7B shows a building that is highly affected by the external environment. An indoor space shown in FIG. 7B is on the third floor, and a three-story building is located nearby. Further, the orientation of building does not face due south.

Therefore, the indoor space shown in FIG. 7B may have a place that is not affected by the sunlight due to the presence of the neighbor building and the orientation of the building itself. For example, a place where one group of indoor units 730 are located in the indoor space may be not affected by the sunlight. On the other hand, a place where another group of indoor units 720 are located may be affected much more by the sunlight than other places, thus having a relatively high temperature. The indoor unit is a device located within the indoor space and may include a temperature control unit.

Figure 7C:
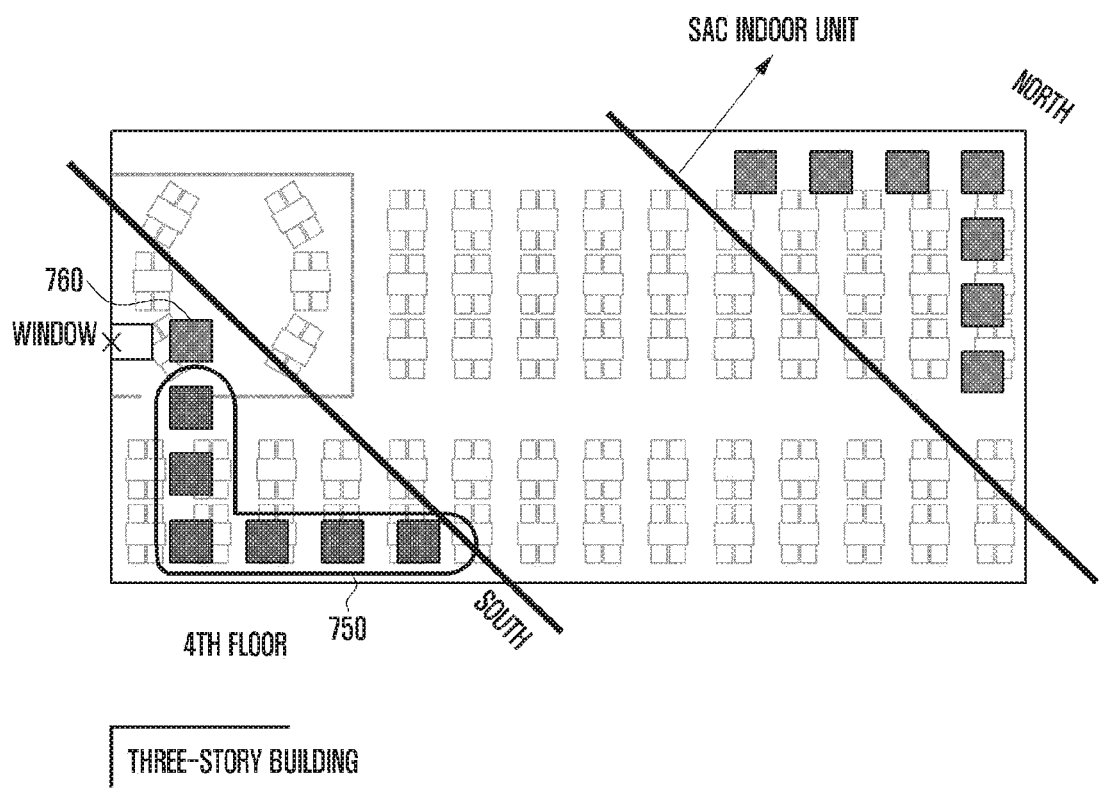

Contrary to FIG. 7B, FIG. 7C shows an indoor space on the fourth floor. Since there is only a three-story building in the vicinity, the indoor space shown in FIG. 7C may be affected by the sunlight at any place. Thus, a place where a group of indoor units 750 are located may have a relatively high temperature due to the influence of sunlight. On the other hand, a place where another group of indoor units 760 are located has no nearby window, so that the temperature may be relatively low due to no influence of sunlight.

As described above, depending on the external environment, a temperature difference may occur even in the same indoor space. Now, a method for controlling the temperature of the indoor space in consideration of the influence of the external environment will be described below.

Figure 8A:
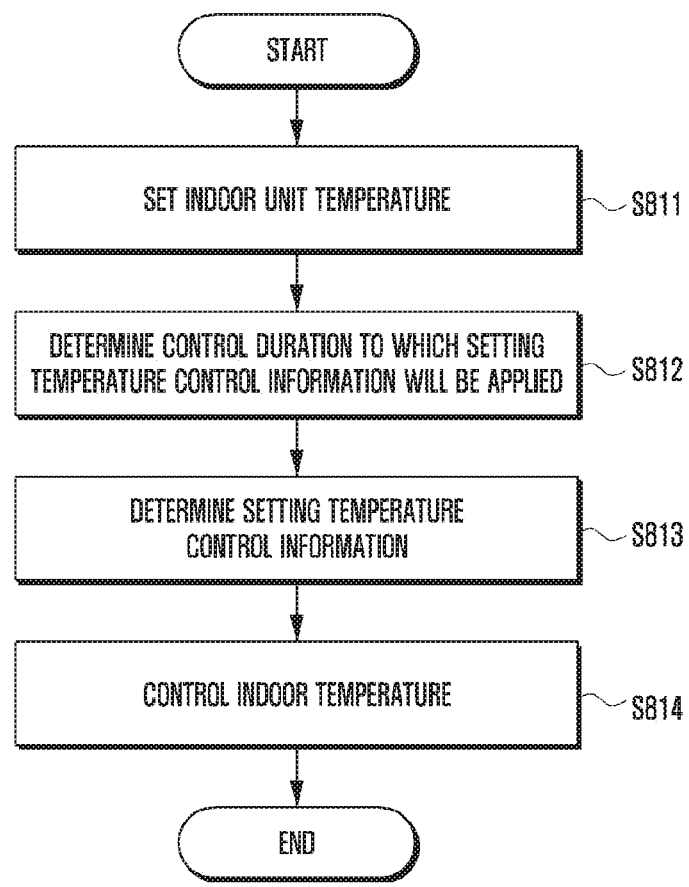
FIG. 8A is a flow diagram illustrating a method for controlling a temperature of an indoor space according to another embodiment of the present invention.

FIG. 8A is a flow diagram illustrating a method for controlling a temperature of an indoor space according to another embodiment of the present invention.

Referring to FIG. 8A, at step S811, the server may set the temperature of an indoor unit located in a central region of a building. The server may set the setting temperature of the indoor unit located in the central region of the building without feedback from the central region. While a peripheral region of the building is affected by the outdoor temperature, the central region of the building is not greatly affected by the outdoor temperature. Therefore, the server may set the temperature of the indoor unit located in the central region of the building without considering the influence of the outdoor temperature. In this case, a temperature at which the user located in the central region of the building does not feel uncomfortable (i.e., a temperature at which the user does not feel the necessity of changing the temperature) may be referred to as a setting temperature having no feedback.

Alternatively, an administrator may set the temperature of the indoor unit located in the central region of the building. The server may set the temperature of the indoor unit to a specific temperature determined according to a time zone. Alternatively, the server may set the temperature of the indoor unit according to the outdoor temperature.

At step S812, the server may determine a control duration to which the setting temperature control information is to be applied. That is, the server may count a user's discomfort frequency for a certain period and then determine the control duration by using a time when a discomfort state occurs.

The user's discomfort state means a state where the user feels uncomfortable, for example, a state in which the indoor temperature is below or above a threshold value. Alternatively, when there is a user input (thermal comfort, e.g. hot or cold) into the server, or when the user changes the temperature of the indoor unit, the server may determine that the user is in a discomfort state, and increase the discomfort frequency. In addition, the server that counts the discomfort frequency may determine the control duration by using the discomfort frequency counted in each time zone. For example, if an event that the user lowers the temperature of the indoor unit at 2 pm in summer occurs, the server may increase the discomfort frequency by 1 at 2 pm. In this case, based on 2 pm, the server may determine a predetermined duration as the control duration. If the predetermined interval is 2 hours, the server may determine the control duration from 1 pm to 3 pm.

At this time, the server may determine the control duration for each indoor unit located inside the building. Since the indoor units of the building may have different time zones influenced by external factors, depending on locations thereof, the server may determine the control duration for each indoor unit.

Then, at step S813, the server may determine the setting temperature control information by using user's feedback information. Also, the server may increase or decrease the temperature of the indoor unit by a predetermined minimum unit temperature in the determined control duration. In the above example, if a user's event of lowering the temperature of the indoor unit occurs, the indoor unit may lower the temperature thereof by the predetermined temperature in the control duration (2 pm) of the next day.

If a user's discomfort state occurs even after the temperature is controlled (e.g., when there is a user input or when the user changes the temperature of the indoor unit), the server may increase the user's discomfort frequency and lower the temperature of the indoor unit by the predetermined temperature. In this manner, the server may change the temperature until the user's discomfort state does not occur, determine the temperature at which the user's discomfort state does not occur, and determine this as the setting temperature control information.

Alternatively, using temperature information set by the user, the server may determine the setting temperature control information.

In this embodiment, since the control duration is determined for each indoor unit according to the location of the indoor unit, the setting temperature control information may also be determined for each indoor unit.

At step S814, the server that determines the setting temperature control information may control the temperature of the indoor unit according to the setting temperature control information in the determined control duration. Meanwhile, the indoor units of the building may be classified into a central indoor unit located in the central region of the building and a peripheral indoor unit located in the peripheral region of the building. In this case, since the central indoor unit is not much affected by the outside air, the server may determine the setting temperature control information for only the peripheral indoor unit and then control the temperature according to the setting temperature control information.

Figure 8B:
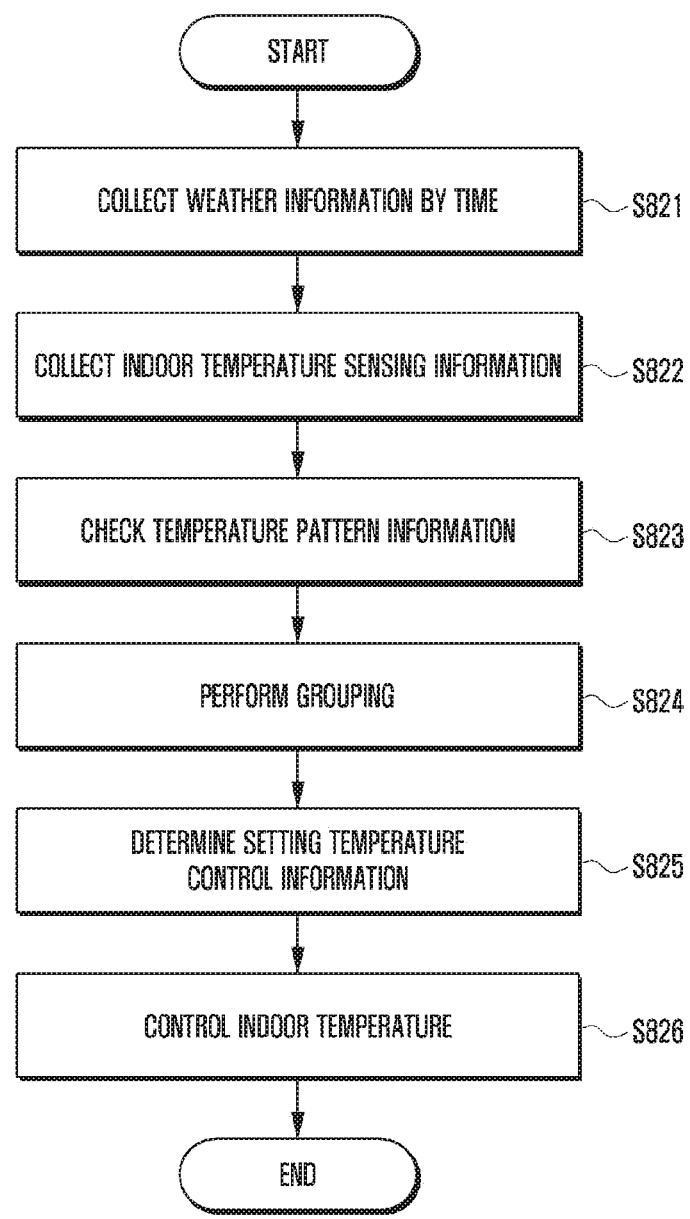
FIG. 8B is a flow diagram illustrating another method for controlling a temperature of an indoor space according to another embodiment of the present invention.

FIG. 8B is a flow diagram illustrating another method for controlling a temperature of an indoor space according to another embodiment of the present invention.

FIG. 8B shows a method for controlling the temperature of indoor units by grouping indoor units that are similarly affected by the outdoor temperature.

Referring to FIG. 8B, at step S821, the server may collect weather information by time. This is because the server groups the indoor units by using temperature sensing information and indoor unit setting temperature values as described later and the temperature sensing information may be affected by the weather information according to the time.

At step S822, the server may collect indoor temperature information by using sensors located in respective areas of the indoor space. Such a sensor may be located near a window or be attached to the peripheral indoor unit. In this disclosure, a sensing value received through the sensor for collecting the indoor temperature information may be referred to as temperature sensing information or a peripheral sensor value.

The server that collects the indoor temperature information may check temperature pattern information of the indoor space at step S823. The temperature pattern information may refer to information about a difference between the time-based temperature sensing information collected by the sensor and the setting temperature value of the indoor unit.

Then, at step S824, the server may perform grouping areas of the indoor space by using the temperature pattern information. Alternatively, the server may group the indoor units located in each area by using the temperature pattern information.

Figure 9A:
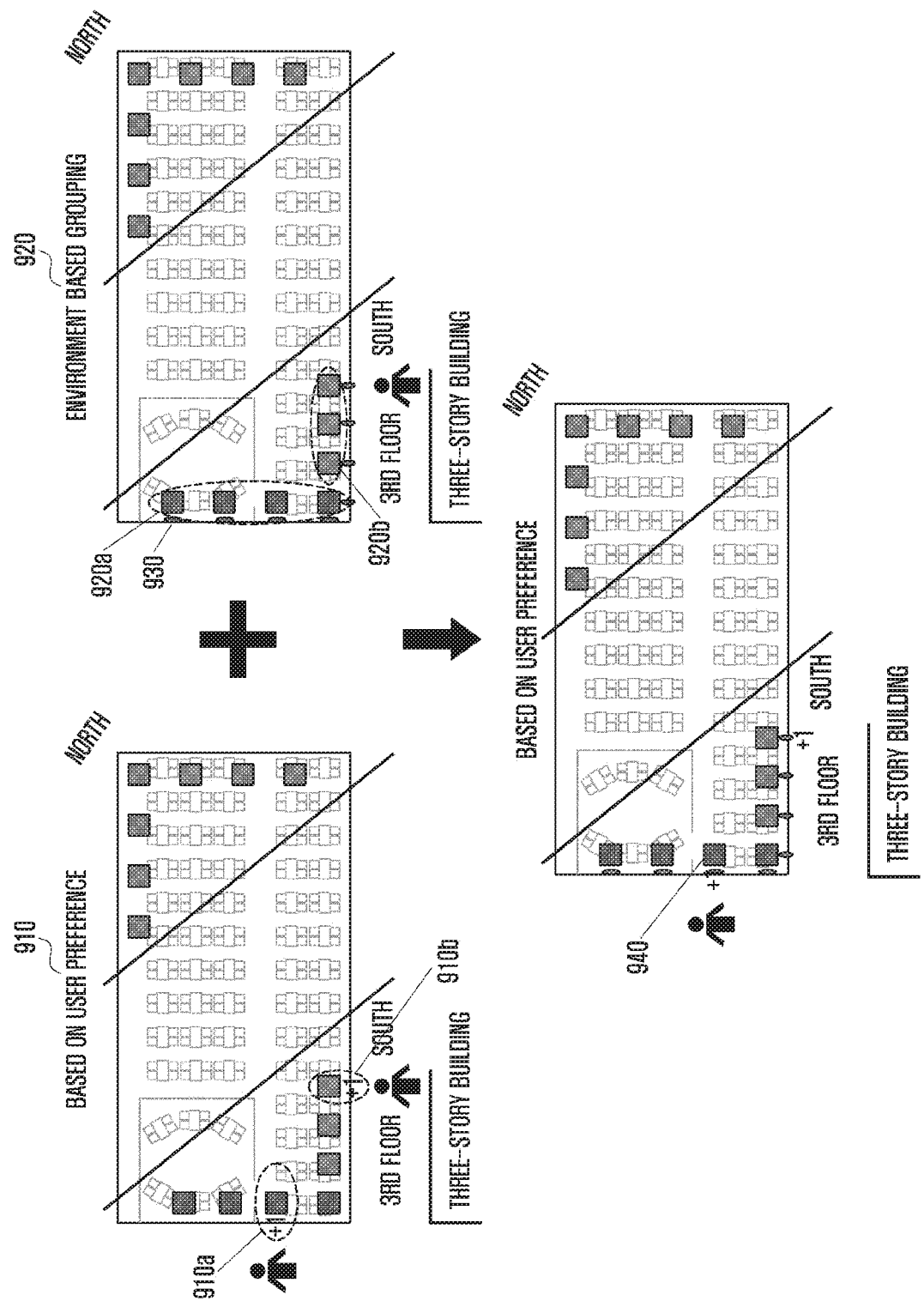
FIG. 9A is a diagram illustrating a method for controlling a temperature of an indoor space according to another embodiment of the present invention.
Figure 9B:
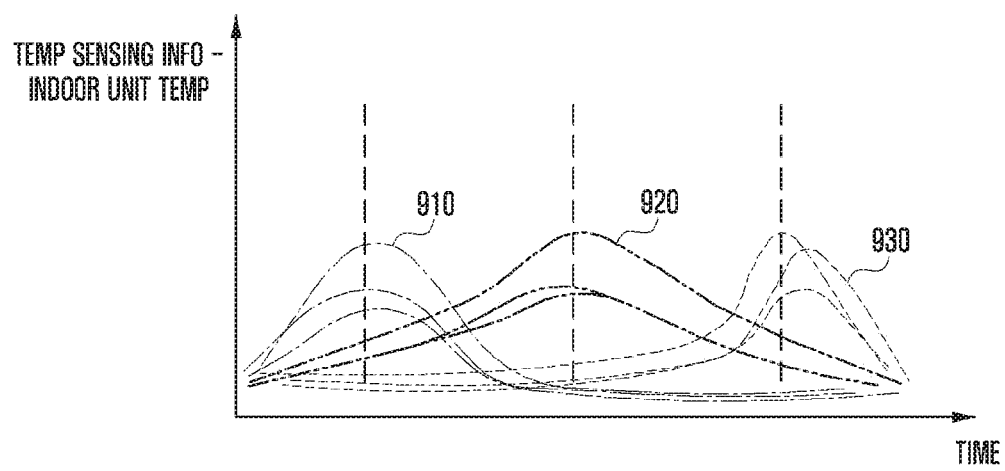
FIG. 9B is a diagram illustrating temperature pattern information according to another embodiment of the present invention.

The temperature pattern information may be represented as shown in FIG. 9B, and the server may group the areas having similar temperature pattern information or group the indoor units in the corresponding areas. When a difference of peak temperature at the same time or within a certain time range is within a predetermined value k° C. in the temperature pattern information, the server may determine that the temperature pattern information is similar. Therefore, the server may group the indoor units having a difference of peak temperature within k° C. into the same group. As above, by deriving the temperature pattern information and grouping indoor units or areas, factors that may affect the indoor temperature, such as the floor of the indoor space, the orientation of the building, surrounding features, the presence of windows, the transmittance of a window, or the transmittance of a window blind, may be automatically reflected.

After grouping, the server may determine the setting temperature control information by using user feedback at step S825 and then control the setting temperature of the indoor unit at step S826. The user feedback may refer to input information for the user to control the temperature of the indoor unit.

At this time, the server may select, as the control duration, an duration in which a difference between the indoor unit setting temperature and the indoor temperature information exceeds a predetermined value in the temperature pattern information, determine the setting temperature control information in the selected duration, and control the setting temperature of the indoor unit. A method for determining the setting temperature control information is as described above. However, in case of grouping and managing the indoor units, there is no need to receive user feedback for all the indoor units. For example, when any user feedback is received for any one of the indoor units in the same group, the same setting temperature control information may be applied to the other indoor units in the same group. Therefore, even with a small feedback, the setting temperature control information may be applied to a plurality of indoor units.

In addition, the temperature pattern information of the indoor units belonging to the same group may be shifted to the left or right within a predetermined range on the time axis, depending on a time-varying position of the sun. In this case, the server may control the setting temperature of the indoor unit by using the setting temperature information corresponding to the temperature pattern information shifted on the time axis for each indoor unit. That is, the server may shift the setting temperature control information, based on the time when the temperature pattern information is shifted for each indoor unit, and may control the setting temperature of the indoor unit by applying the shifted setting temperature control information. This shift of the temperature pattern information and the setting temperature control information to the left and right within the predetermined range on the time axis may be referred to as shifting.

For example, it is assumed that a first indoor unit, a second indoor unit, and a third indoor unit belong to the same group and the temperature pattern information value has a peak at 2 pm. In this case, the temperature pattern information of the second indoor unit shifts rightward along the time axis depending on the position of the sun, and a peak time of the temperature pattern information value may be shifted to 3 pm. Then, the server may also shift the setting temperature control information of the second indoor unit by one hour on the time axis. When the temperature pattern information is shifted to the left or right, the control for each indoor unit is possible. Also, it is possible to shift and control the setting temperature control information for all the indoor units included in the same group.

After determining the setting temperature control information on a certain floor by using the temperature control method described above, the server may equally apply the determined setting temperature control information to the other floors. Alternatively, the server may determine the setting temperature control information for each individual floor.

In addition, the server may control the indoor units in the same group, based on a user's preference. This is because, even when the indoor units are classified into the same group, the setting temperature may be different according to a user's tendency. Thus, the server may receive user feedback and control the temperature by reflecting the user's preferences. Details will be described later.

FIG. 9A is a diagram illustrating a method for controlling a temperature of an indoor space according to another embodiment of the present invention.

Referring to FIG. 9A, the indoor space 920 shows a grouped area according to the influence of the external environment.

The indoor space 920 may have a plurality of indoor units 920a and 920b. In addition, a sensor may be included in the indoor space 920. One sensor may be located in each area where each indoor unit is located. Alternatively, the number of sensors may be smaller than the number of indoor units.

The server may group the indoor units of the indoor space 920 by using the temperature pattern information, which is described in FIG. 9B.

FIG. 9B is a diagram illustrating temperature pattern information according to another embodiment of the present invention.

Referring to FIG. 9B, the temperature pattern information may indicate a time-varying difference between the temperature sensing information and the setting temperature value of the indoor unit.

That is, the server may generate the temperature pattern information by using the difference between the setting temperature value of each indoor unit and the temperature sensed by the sensor located closest to the indoor unit.

The difference between the temperature sensing information and the indoor unit setting temperature value, i.e., the difference between the indoor unit setting temperature set by the server or user and the actual temperature of the indoor space, may depend on external factors such as the influence of sunlight and the capacity of the indoor unit as described above. For example, although the indoor unit is set to 25 degrees, the temperature of some areas may be 28 degrees due to the influence of sunlight, the capacity and location of the indoor unit, and the like. The greater the difference between the temperature sensing information and the indoor unit setting temperature value, such as a group 910, the greater the user's discomfort.

Therefore, it may be determined that the indoor space having a similar variation of the difference between the temperature sensing information and the indoor unit setting temperature value is affected similarly by the external environment. In this case, the indoor units having similar temperature pattern information may be grouped and controlled in the unit of group. As described above, when the temperature difference of the peak value within a certain time range does not exceed a predetermined value, it may be determined that the temperature pattern information is similar.

In this figure, the server may generate groups 910, 920, and 930 by grouping the indoor units having similar temperature pattern information.

Returning to FIG. 9A, the server may generate the first group 920a and the second group 920b according to the temperature pattern information.

In addition, the server may receive user feedback and reflect a user's preference.

Referring to the indoor space 910, the server may receive information that the first user located in the first group area increases the temperature of an indoor unit 910a by one degree.

Also, the server may receive information that the second user located in the second group area increases the temperature of another indoor unit 910b by one degree.

Then, the server may separately control the indoor units belonging to the first group and the second group. In addition, the server may set the temperature of each of the indoor units 910a and 910b to be higher by one degree than those of other indoor units in the same group.

A method for controlling the grouped indoor units may use the method described above in FIG. 2 to FIG. 6. That is, the server may generate the setting temperature control information for each group in the same manner as described above, and control the temperature of the indoor space according to the external temperature. Details are omitted.

Meanwhile, according to another embodiment, the server may control the grouped indoor units to perform different functions.

The indoor unit may perform functions such as ventilation, dehumidification, humidification, and oxygen generation as well as the function of a cooling/heating unit.

Also, the server may control the indoor units included in the same group to perform different functions.

For example, the server may store information about humidity, oxygen amount, and the like that the user can feel comfortable. In this case, the server may control some of the indoor units included in the same group to regulate the humidity and also control the other indoor units to regulate the amount of oxygen.

In addition, the server may control the respective indoor units to perform different functions so that the same environment or a user's preferred environment can be created according to time-varying positions or density of occupants.

In addition, the server may control the respective indoor units to perform different functions so that the same environment or a user's preferred environment can be created even in different positions having different environmental conditions.

For example, if occupants are concentrated in a meeting room, the temperature of the meeting room may increase and the amount of oxygen may decrease. Thus, the server may control some of the indoor units included in the conference room to perform the function of an oxygen generator and the others to perform the function of an air conditioner.

In another example, on a rainy day, the humidity of the indoor space may be increased. Accordingly, the server may measure the humidity of each group, regulate the temperature by operating an air conditioner or heater according to the average outdoor temperature, and controlling some devices to perform the function of a dehumidifier.

Meanwhile, the above-discussed operation may be performed by a network of grouped indoor units rather than by the server.

Figure 10:
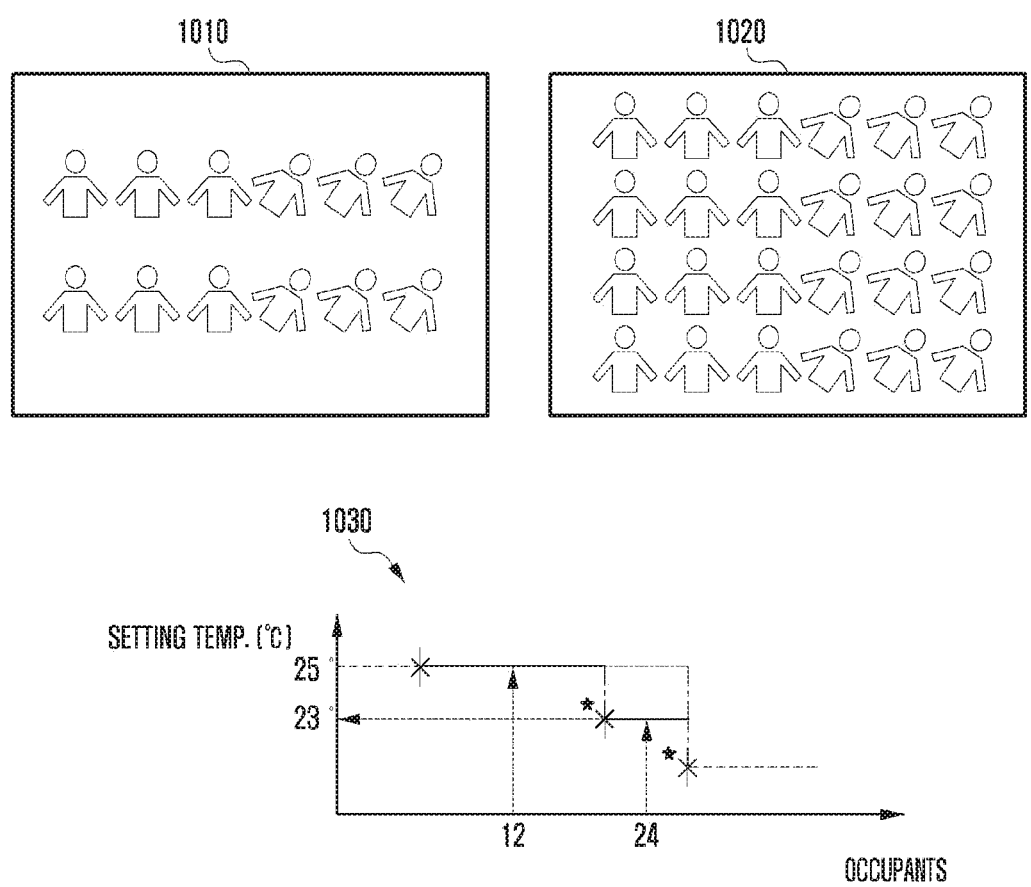
FIG. 10 is a diagram illustrating a method for controlling a temperature of an indoor space according to still another embodiment of the present invention.

FIG. 10 is a diagram illustrating a method for controlling a temperature of an indoor space according to still another embodiment of the present invention.

Referring to FIG. 10, if may users are present in a certain space such as a meeting room, the user's comfort level may decrease. Although a meeting room is used hereinafter for description, this is exemplary only and not to be construed as a limitation. This description may be applied equally to any other space.

For example, twelve users are located in a first meeting room 1010, and twenty-four users are located in a second meeting room 1020. When the number of users located in the same space increases, the temperature of the space may also increase. In addition, the temperature of the indoor space may be varied depending on the number of occupants. Therefore, if the temperatures of the indoor units respectively located in the first and second meeting rooms are set equally in summer, the user's comfort may be reduced in the second meeting room. Therefore, there is a need for a method of controlling the temperature of a certain space according to the number of occupants.

A graph 1030 shows the setting temperature control information that indicates the setting temperature value according to the number of occupants. A method for determining the setting temperature control information 1030 is similar to that described above in FIGS. 5A to 5C. That is, the setting temperature control information may be determined through the extension step, the addition step, the change step, and the simplification step after user's setting temperature information according to the number of occupants is received. Details are omitted.

Thus, the server may determine the number of occupants through a sensor in the meeting room and control the temperature of the indoor space by using the setting temperature control information. For example, if the number of occupants is twelve in the first meeting room, the server may set the setting temperature to 25 degrees in accordance with the setting temperature control information. On the other hand, if the number of occupants is twenty four in the second meeting room, the server may set the setting temperature to 23 degrees in accordance with the setting temperature control information.

Meanwhile, the server may determine the temperature of the indoor unit by using separately the setting temperature control information for each time zone under the influence of the outdoor temperature. For example, in this figure, the setting temperature control information 1030 may be applied to a time zone from 2 pm to 3 pm. According to this, the setting temperature control information applied to a certain forenoon time zone may be set higher than the setting temperature control information 1030. That is, the server may store the setting temperature control information for each time zone and control the setting temperature of the indoor space by checking the number of occupants in each time zone.

Alternatively, the server may determine the temperature of the indoor unit by using separately the setting temperature control information for each control duration determined based on the outdoor temperature. A method for determining the control duration is similar to that described with reference to FIG. 3C and will not be described below. For example, it may be determined that the first control duration is from 6 am to 12 pm, the second control duration is from 12 pm to 8 pm, and the third control duration is from 8 pm to 6 pm, and the setting temperature control information 1030 may be applied in the second control duration. The server may separately store the setting temperature control information in the first control duration and the third control duration, and may determine the temperature of the indoor unit by using the number of occupants and the setting temperature control information per control duration including a user's occupying time.

In addition, the outdoor temperature may be different even in the same time zone, and thus the influence on the indoor space may vary depending on the outdoor temperature. Therefore, the server may determine the setting temperature control information by reflecting the outdoor temperature, and thereby control the temperature of the indoor unit. That is, the server may store the setting temperature information determined based on two parameters including the outdoor temperature and the number of occupants. For example, the server may determine a three-dimensional graph of the setting temperature control information in which the x-axis represents the outside temperature, the y-axis represents the number of occupants, and the z-axis represents the setting temperature. Accordingly, the server may control the temperature of the indoor unit to the setting temperature determined according to the outdoor temperature measured by a sensor closest to the indoor space and the sensed occupant number. Therefore, the server may increase the user's comfort level by reflecting the influence of external environment and controlling the temperature of the indoor unit.

Figure 11:
FIG. 11 is a diagram illustrating a configuration of a temperature control device according to the present invention.

FIG. 11 is a diagram illustrating a configuration of a temperature control device according to the present invention.

Referring to FIG. 11, the temperature control device of the present invention may be configured to include a communication unit 1111, a controller 1120, and a storage 1130.

The communication unit 1110 may perform communication with another device. Also, the communication unit 1110 may receive weather forecast from a weather station through a network. Further, the communication unit 1110 may transmit control information for controlling the temperature to the temperature control device.

The controller 1120 may determine a control duration to set the setting temperature control information. At this time, the controller 1120 may determine the control duration, based on whether the user is present or not in a certain space, or based on the maximum temperature during a day.

In addition, the controller 1120 may predict the setting temperature change time of the next control duration by using the determined control duration information. At this time, when the setting temperature change time is changed, the controller 1120 may control to change the control duration.

Also, the controller 1120 may control to receive user input information (setting temperature information) entered into the temperature control device. Using the received setting temperature information, the controller 1120 may determine the setting temperature control information and determine a start time point of the next control duration.

Further, the controller 1120 may predict an average outdoor temperature of the next control duration by using the received weather forecast. Then, the controller 1120 may determine the setting temperature in the next control duration by using the predicted average outdoor temperature and the setting temperature control information. If a difference between the predicted average outdoor temperature and the actual outdoor temperature is greater than a predetermined value, the controller 1120 may change the setting temperature to reflect the actual outdoor temperature.

In addition, the controller 1120 may add, update, or change the setting temperature control information according to the received setting temperature information. That is, when the received setting temperature information includes an average outdoor temperature outside the setting temperature control information determined by previously received setting temperature information, the controller 1120 may update the setting temperature control information by adding the received setting temperature information.

On the other hand, when the setting temperature of the average outdoor temperature included in the setting temperature control information is different, the controller 1120 may update the setting temperature control information by reflecting the received setting temperature information.

At this time, the controller 1120 may update the setting temperature control information when a predetermined number of information similar to the setting temperature information are received. The information similar to the setting temperature information may indicate a case where a difference of setting temperatures is smaller than a predetermined value.

The controller 1120 may update or change the setting temperature control information by using the received setting temperature information, and then control the temperature of the indoor space by using the setting temperature control information and the average outdoor temperature.

In addition, the controller 1120 may determine the setting temperature control information differently depending on the type of a space and then control the temperature of the indoor space.

For example, the controller 1120 may distinguish a peripheral region of a building from a central region of the building. In the building, a closed space (e.g., a meeting room) of a certain size or less may exist. For example, in case of the central region, since the temperature of the indoor space is hardly influenced by the outside, the server may store a user's preferred temperature and determine the setting temperature of the indoor unit in the central region by using the user's preferred temperature. On the other hand, in case of the peripheral region, since the temperature of the indoor space is affected not only by the outdoor temperature but also by various external factors such as a condition of the building and surrounding features, the controller 1120 may determine the setting temperature control information by using the setting temperature information for the average outdoor temperature as described above. In addition, the controller 1120 may determine the setting temperature control information differently according to the type of the space. Meanwhile, in case of the closed space, the indoor temperature may increase due to the density of occupants as well as external influences. Therefore, the controller 1120 may determine the setting temperature control information, based on the number of occupants. Details are the same as those described with reference to FIG. 10, and are omitted in the following.

The storage 1130 may store the determined setting temperature control information. Also, the storage 1130 may store previously received setting temperature information. In order to determine the setting temperature control information, the setting temperature information for a certain number of days (e.g., three days) should be used. Therefore, the storage 1130 may store the received setting temperature information to be used for determining the setting temperature control information.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

The invention claimed is:

1. A temperature control method comprising:
   determining a plurality of control durations which are time durations for controlling a setting temperature of a specific space based on at least one of a highest weather information value during a day, and a discomfort frequency counted by a time zone, the discomfort frequency being based on a number of times a user changes the setting temperature of the specific space;
   collecting data including predicted weather information and user's setting temperature information for each control duration;
   determining setting temperature control information based on the collected data for each control duration; and
   controlling the setting temperature of the specific space until a time when the setting temperature is changed, based on the determined setting temperature control information for each control duration,
   wherein the time when the setting temperature is changed is determined by the control duration,
   wherein determining the setting temperature control information for each control duration comprises:
   receiving first setting temperature information corresponding to specific weather information and extending a temperature value of the first setting temperature information to determine the setting temperature control information,
   updating the setting temperature control information based on a mode of controlling the device and a temperature value of second setting temperature information corresponding to specific weather information not included in the setting temperature control information being identified, and
   changing the setting temperature control information based on a temperature value of third setting temperature information corresponding to specific weather information included in the setting temperature control information being identified more than twice,
   wherein the mode of controlling includes an eco mode and a comfort mode,
   wherein, in case that the eco mode is set, a temperature value of the setting temperature control information is changed to the temperature value of the second setting temperature information while being maintained up to the temperature value of the first setting temperature information, and
   wherein, in case that the comfort mode is set, the temperature value of the setting temperature control information is immediately changed to the temperature value of the second setting temperature information.

2. The method of claim 1,
   wherein the setting temperature information includes setting temperature information for an average outdoor temperature in each control duration.

3. The method of claim 1, wherein the determining the setting temperature control information comprises determining the setting temperature control information, based on a space type, and
   wherein the setting temperature control information is determined based on the number of occupants when the space is a closed space.

4. The method of claim 1, wherein the determining the setting temperature control information includes:
   simplifying the setting temperature control information.

5. The method of claim 1, further comprising:
   checking temperature pattern information;
   grouping indoor units, based on the temperature pattern information; and
   controlling a temperature for each group of the indoor units.

6. The method of claim 5, wherein the controlling the temperature for each group of the indoor units includes, when the temperature pattern information of a first indoor unit among the grouped indoor units is shifted, controlling the temperature of the first indoor unit, based on the setting temperature control information corresponding to the shifted temperature pattern information.

7. The method of claim 5, wherein the indoor units included in the grouped indoor units are configured to perform different functions according to weather information of the space.

8. A temperature control device comprising:
   a transceiver configured to perform communication with other device; and
   a controller configured to:
   determine a plurality of control durations which are time durations for controlling a setting temperature of a specific space based on at least one of a highest weather information value during a day, and a discomfort frequency counted by a time zone,
   collect data including predicted weather information and user's setting temperature information for each control duration,
   determine setting temperature control information based on the collected data for each control duration, and
   control the setting temperature of the specific space until a time when the setting temperature is changed, based on the determined setting temperature control information for each control duration,
wherein the time when the setting temperature is changed is determined by the control duration,
wherein, in determining the setting temperature control information for each control duration the controller is further configured to:
receive first setting temperature information corresponding to specific weather information and extending a temperature value of the first setting temperature information to determine the setting temperature control information,
update the setting temperature control information based on a mode of controlling the device and a temperature value of second setting temperature information corresponding to specific weather information not included in the setting temperature control information being identified, and
change the setting temperature control information based on a temperature value of third setting temperature information corresponding to specific weather information included in the setting temperature control information being identified more than twice,
wherein the mode of controlling includes an eco mode and a comfort mode,
wherein, in case that the eco mode is set, the controller changes a temperature value of the setting temperature control information to the temperature value of the second setting temperature information while being maintained up the temperature value of the first setting temperature information, and
wherein, in case that the comfort mode is set, the controller immediately changes the temperature value of the setting temperature control information to the temperature value of the second setting temperature information.

9. The device of claim 8, wherein the controller is further configured to determine the setting temperature control information, based on a space type, and to determine the setting temperature control information based on the number of occupants when the space is a closed space.

10. The device of claim 8, wherein the controller is further configured to:
simplify the setting temperature control information.

11. The device of claim 8, wherein the setting temperature information includes setting temperature information for an average outdoor temperature in each control duration.

12. The device of claim 8, wherein the controller is further configured to check temperature pattern information, to group indoor units, based on the temperature pattern information, and to control a temperature for each group of the indoor units.

13. The device of claim 12, wherein the controller is configured to, when the temperature pattern information of a first indoor unit among the grouped indoor units is shifted, control the temperature of the first indoor unit, based on the setting temperature control information corresponding to the shifted temperature pattern information.

14. The device of claim 12, wherein the indoor units included in the grouped indoor units are configured to perform different functions according to weather information of the space.

* * * * *